United States Patent
Oogawara et al.

(10) Patent No.: US 7,841,762 B2
(45) Date of Patent: Nov. 30, 2010

(54) LIQUID MIXING APPARATUS AND METHOD OF LIQUID MIXING

(75) Inventors: Takashi Oogawara, Kanagawa (JP); Goichi Hirota, Kanagawa (JP); Katsuji Nishiyama, Saitama (JP)

(73) Assignee: Toshiba Plant Systems & Services Corporation, Tokyo (JP)

( * ) Notice: Subject to any disclaimer, the term of this patent is extended or adjusted under 35 U.S.C. 154(b) by 1001 days.

(21) Appl. No.: 10/519,396

(22) PCT Filed: Jul. 7, 2003

(86) PCT No.: PCT/JP03/08589

§ 371 (c)(1),
(2), (4) Date: Jul. 18, 2005

(87) PCT Pub. No.: WO2004/004881

PCT Pub. Date: Jan. 15, 2004

(65) Prior Publication Data

US 2005/0270896 A1    Dec. 8, 2005

(30) Foreign Application Priority Data

Jul. 9, 2002    (JP)    ............................. 2002-199826

(51) Int. Cl.
 *B01F 11/00* (2006.01)
(52) U.S. Cl. ...................... 366/118; 366/127
(58) Field of Classification Search .............. 366/118, 366/127

See application file for complete search history.

(56) References Cited

U.S. PATENT DOCUMENTS

| | | | | |
|---|---|---|---|---|
| 2,543,818 A | * | 3/1951 | Wilcox | ........................ 366/118 |
| 2,615,692 A | * | 10/1952 | Muller | ........................ 366/273 |
| 2,681,798 A | * | 6/1954 | Muller | ........................ 366/118 |
| 2,828,231 A | * | 3/1958 | Henry | ........................... 134/1 |

(Continued)

FOREIGN PATENT DOCUMENTS

| | | |
|---|---|---|
| GB | 508675 | 6/1939 |
| GB | 1150306 | 4/1969 |
| JP | 2000-24494 | 1/2000 |
| JP | 2000-146986 | 5/2000 |
| JP | 2001-225060 | 8/2001 |
| JP | 2001-276593 | 10/2001 |

OTHER PUBLICATIONS

Patent Abstracts of Japan, JP 58-163425, Sep. 28, 1983.

*Primary Examiner*—David L Sorkin
(74) *Attorney, Agent, or Firm*—Oblon, Spivak, McClelland, Maier & Neustadt, L.L.P.

(57) ABSTRACT

An apparatus includes a vessel 10 for storing a liquid mixture 11 containing a liquid fuel 2 and an incompatible liquid 4 such as water or for allowing the liquid mixture 11 to flow therethrough, a vibrator 13 having at least one portion making contact with the liquid mixture in the vessel, a vibration generator 20 for vibrating the vibrator at high frequency, and a reflector 14 spaced from the vibrator 13 at a small distance. The incompatible liquid 4 is dispersed in and mixed with the fuel 2 by vibrating the vibrator at high frequency, whereby an emulsion fuel 12 having an ultra fine particle size and high mixture density is produced. According to the above configuration, cavitation can be extremely efficiently generated. The following technique is disclosed: a technique for producing various types of liquid mixture having an ultra fine particle size using the cavitation efficiently. In particular, the following mixture can be produced in a short time with high efficiency: a liquid mixture, such as an emulsion fuel, a liquid industrial material, a food product, a cosmetic product, or a drug product, having an ultra fine particle size, high mixture density, and high quality. If the liquid mixture is stored over a long period of time, liquid components thereof are hardly separated from each other.

4 Claims, 15 Drawing Sheets

U.S. PATENT DOCUMENTS

| | | | |
|---|---|---|---|
| 3,715,104 A | * | 2/1973 | Cottell ........................ 366/118 |
| 4,118,797 A | * | 10/1978 | Tarpley, Jr. ................... 366/127 |
| 4,259,021 A | * | 3/1981 | Goudy, Jr. .................... 366/118 |
| 5,375,926 A | * | 12/1994 | Omasa ........................ 366/118 |
| 5,585,044 A | | 12/1996 | Kawakami et al. |
| 2003/0042326 A1 | | 3/2003 | Jameson et al. |

* cited by examiner

LIQUID MIXING APPARATUS AND METHOD OF LIQUID MIXING

TECHNICAL FIELD

The present invention relates to techniques for mixing various liquids, which is useful in producing various liquid mixtures such as fuel products, industrial materials, food products, cosmetic products and drug products, and particularly relates to an apparatus for mixing liquids and a method of mixing such liquids, which are useful in producing a liquid mixture with ultra-fine particle size and high mixture density effectively utilizing a cavitation effect.

BACKGROUND ART

In general, diesel engine vehicles run on gas fuel. Recently, the following problem has become a matter of public concern. That is, emissions, such as NOx, unburned hydrocarbons, and particles, contained in exhaust gas cause air pollution to impair human health.

Therefore, various techniques have been developed to clean exhaust gas from diesel engines. The amount of emitted NOx and particulates are reduced with, for example, ceramic filters or special catalyst devices attached to ends of exhaust pipes of engines.

Diesel engine vehicles, particularly heavy-duty trucks, have a large piston displacement and therefore emit a large amount of exhaust gas from their engines. Hence, exhaust gas-cleaning systems for these vehicles are large in size. Furthermore, since chemical substances contained in the exhaust gas are trapped with micropore filters or catalysts, an increase in mileage causes clogging. Therefore, internals of the systems must be cleaned at periodic intervals, whereby clogging materials are removed.

In recent years, in order to avoid the increase in the system size and in order to eliminate cleaning operations, some techniques for reducing the amount of particles in exhaust gas by improving diesel fuel have been developed.

One of such techniques includes a proposal of an apparatus for preparing emulsion by mixing water and diesel fuel such as gas oil and then agitating the liquid mixture with a screw propeller. An emulsion fuel prepared in such a manner can be completely burned because water is vaporized by combustion to create a small explosion. Thus, the amount of created NOx and particles is slight.

For such a screw-type agitating unit, there are problems in that the size thereof is large and it takes a long time to prepare the emulsion fuel. Furthermore, for the emulsion fuel, there is a problem in that water and oil are separated from each other in a short time while the emulsion fuel is allowed to stand for a while because water clusters contained in the emulsion fuel have a large size.

Various liquid mixtures are used to produce, for example, industrial materials such as ceramic materials, paste food products such as creams, cosmetic products or drug products in addition to fuel products. Such liquid mixtures for these uses must have properties required for preparing intermediate or final products, having high accuracy in size and shape and high quality, for industrial uses, properties required for preparing food having good eating quality, superior cosmetic properties, or high drug properties. In these uses, any liquid mixture with an ultra fine particle size and high mixture density has not been obtained.

Japanese Unexamined Patent Laid-open Publication No. HEI 10-277375 discloses a known technique for converting fuel into emulsion having a fine particle size using adiabatic expansion and ultrasonic waves. For this technique, the emulsion is uniform because cavitation is not used.

Japanese Unexamined Patent Laid-open Publication No. HEI 8-310971 discloses a known technique for achieving a high contrast effect with a small dose of a contrast medium for ultrasonic diagnosis by promoting the vaporization of a dispersant using ultrasonic cavitation.

Furthermore, Japanese Unexamined Patent Laid-open Publication No. HEI 10-298051 discloses a known technique for preparing an oil-in-water emulsion with good stability by mixing oil and water together with polymer particles and then homogenizing the mixture using cavitation.

For the known technique for mixing fuel such as gas oil with an incompatible liquid such as water to prepare an emulsion fuel, there are problems in that the apparatus is large in size because of the location of a screw-type agitating unit, it takes a long time to prepare the emulsion fuel, and water and oil in the emulsion fuel are separated from each other in a short time, as described above. Therefore, this technique cannot be directly applied to diesel engines and combustion units such as boilers.

According to the technique described in Japanese Unexamined Patent Laid-open Publication No. HEI 10-277375, in order to prepare uniform emulsion by finely atomizing the fuel using adiabatic expansion and ultrasonic waves, it is preferable not to generate cavitation. This theory is based on the fluidity of the fuel finely atomized. In order to finely atomize liquid, it is considered to be preferable to use high energy due to cavitation effect, as described in the known documents (Japanese Unexamined Patent Laid-open Publication Nos. HEI 8-310971 and HEI 10-298051).

However, neither any system nor any method of efficiently achieving high energy is particularly disclosed in the above two documents relating to the utilization of cavitation effects. Examples of an ordinary technique for achieving such cavitation effects include an agitating unit, as well as the screw-type agitating unit, operated in liquid at high speed and a single vibrating plate vibrating in liquid at high speed. However, any sufficient cavitation effect cannot be necessarily achieved and any liquid mixture with a fine particle size can hardly be prepared efficiently utilizing such a technique. For a liquid mixture prepared by utilizing any one of the known techniques, there is a problem in that the quality of the mixture cannot be maintained for a long time because liquid components are readily separated from each other in a relatively short time as described above.

Any liquid mixtures for producing industrial materials such as ceramics, paste food products such as creams, cosmetic products, and drug products having an ultra fine particle size and high mixture density cannot be necessarily obtained by the known techniques, which cannot sufficiently cope with requirements such as an improvement in quality.

Examples of a liquid mixture include a mixture prepared by mixing liquid components, a mixture prepared by mixing a liquid component and a gas component, a mixture prepared by mixing a liquid component and a power component, and a mixture prepared by mixing some of these mixtures. These mixtures prepared by the known techniques do not necessarily have an ultra fine particle size.

The present invention has been made to solve the above problems. It is an object of the present invention to provide techniques for extremely efficiently generating cavitation to produce various liquid mixtures having an ultra fine particle size using the cavitation. In particular, it is an object of the present invention to provide an apparatus for mixing liquids and a method of mixing such liquids. The apparatus and method are useful in producing a liquid mixture, such as an emulsion fuel, an industrial liquid material, a food product, a cosmetic product or a drug product, having a ultra fine particle size, high mixture density and high quality in a short time with high efficiency. Liquid components of the liquid mixture are hardly separated from each other even if the liquid mixture is stored for a long time.

DISCLOSURE OF INVENTION

The inventors have investigated the mechanism of producing various types of liquid mixture having an ultra fine particle size. Examples of the liquid mixture include a liquid mixture obtained by mixing two or more liquid components, a liquid mixture obtained by mixing a liquid component and a gas component, a liquid mixture obtained by mixing a liquid component and a powder component, or a combination of some of those liquid mixtures. As a result, the inventors have found that if a vibrator vibrating at high frequency and a reflector for reflecting vibration transmitted from the vibrator to mixture components are arranged in a vessel for storing the mixture components with a narrow space existing between the vibrator and the reflector, an extremely-high cavitation effect can be achieved, whereby a liquid mixture having an ultra fine particle size, high mixture density, and high quality can be produced.

In an emulsion, which is a liquid mixture consisting of two different liquids, fine droplets of one of the liquids are dispersed in the other one. When the vibrator is moved away from the reflector in such a manner that the emulsion is allowed to flow in the space between the vibrator and the reflector, a negative pressure field is instantaneously created in the space between the vibrator and the reflector to create bubbles, that is, cavitation bubbles, in the liquid mixture.

When the vibrator is then moved toward the reflector using high-frequency vibration, a high pressure field is instantaneously created to break the cavitation bubbles. When the cavitation bubbles are broken, high-pressure shock waves (shock waves created due to bubble collapse) are created. The shock waves have energy sufficient to break clusters of the droplets of the other one of the liquids, that is, outward energy sufficient to break the droplet clusters is generated when the cavitation bubbles are broken. This converts the droplets into smaller pieces.

The strong shock waves are created when the cavitation bubbles are broken, as described above. The pressure of the created shock waves reaches several hundred MPa depending on condition. The shock waves are reflected between the vibrator and the reflector to act as reflected shock waves, which are repeatedly applied to the liquids.

If the vibrator is vibrated at an ultrasonic frequency higher than or equal to 20 KHz, molecule clusters of, for example, liquid fuel are reduced in size due to the vibration. Thus, when the vibrator is ultrasonically vibrated, large molecular chains of the fuel are physically broken into smaller chains by the synergistic effect of the impact pressure of the cavitation and the decomposition of the clusters by the supersonic vibration, whereby the fuel is reformed. Large molecular chains of a liquid component are also broken into smaller chains by the shock waves created by the cavitation and the reflected waves. Therefore, liquid fuel is reformed to be more combustible.

In the cavitation treatment, mixing and stirring are performed, whereby diffusion is promoted. Therefore, a liquid mixture having an ultra fine particle size and high mixture density can be produced. If the supplies of liquid components are maintained constant, the liquid components are mixed at a predetermined ratio, whereby a uniform liquid mixture with a fine particle size can be produced.

Since the vibrator and the reflector are arranged with such a narrow space existing therebetween, the shock waves created due to the collapse of the cavitation bubbles are not diffused but confined, whereby a high-density shock wave field can be created and maintained. A component of the liquid mixture is converted into fine molecular particles and are also repeatedly stirred and mixed by the shock waves, whereby uniform diffusion and mixing can be performed.

The liquid mixture produced as described above hardly returns to its original state as long as energy higher than a certain threshold is not applied thereto. Therefore, the fine particles of the liquid component are kept over a long period of time, that is, liquid components are hardly separated from each other and any problems such as a deterioration in quality do not arise if the liquid mixture is stored for a long time. The liquid mixture with high quality is suitable for various uses.

An apparatus according to the present invention has been developed based on the above findings and is usable to produce a liquid mixture obtained by mixing two or more liquid components, a liquid mixture obtained by mixing a liquid component and a gas component, a liquid mixture obtained by mixing a liquid component and a powder component, or a combination of some of those liquid mixtures. The liquid-mixing apparatus includes a vessel for storing the mixture components; a vibrator, placed in the vessel, having at least one surface with a predetermined area contacting the mixture components; a high-frequency vibration generator, connected to the vibrator, for vibrating the vibrator at high frequency in the direction perpendicular to the face; and a reflector which is placed in the vessel, which is spaced from the vibrator at a small distance in such a manner that the surface of the vibrator contacting the mixture components faces a surface of the reflector, and which reflects high-frequency vibration transmitted from the vibrator to create reflected waves in the mixture components flowing between the facing surfaces. The vibrator and the reflector cooperate to create cavitation bubbles in the mixture components using the decompression action of the vibrator allowed to move away from the reflector by the high-frequency vibration transmitted from the high-frequency vibration generator to the vibrator and also cooperate to break the cavitation bubbles using the compression action of the vibrator allowed to move toward the reflector, and shock wave energy generated by the breaking action extremely reduces the size of the cavitation bubbles and promotes the diffusion of the mixture components, whereby the liquid mixture is allowed to have an ultra fine particle size and high density.

Preferable configurations of the liquid-mixing apparatus are described below.

The high-frequency vibration transmitted from the high-frequency vibration generator to the vibrator has an ultrasonic frequency.

The vibrator creates the cavitation bubbles in the mixture components and then breaks the cavitation bubbles repeatedly.

The high-frequency vibration generator includes a ceramic piezoelectric vibrating member or a vibrating member composed of a super magnetostrictive material or a magnetostrictive material and the vibrator is provided with the reflector or connected to the reflector with a space present therebetween.

The vibrator has a surface section, and the reflector has a surface section facing the surface section of the vibrator, and at least one of these surface sections contains a hard material resistant to cavitation damage caused by the cavitation bubbles.

The reflector is detachably attached to the vessel.

The distance between the vibrator and the reflector is 10 mm or less.

The vessel has a mixture component inlet through which the mixture components are fed to a space between the vibrator and the reflector and also has a liquid mixture outlet through which a liquid mixture, treated between the vibrator and the reflector with shock waves, having a fine particle size, is discharged outward.

The vessel has one or more perforations which extend through a center area of the reflector and through which the mixture components are fed to a space between the vibrator and the reflector.

At least one of a surface of the vibrator which faces the reflector and a surface of the reflector which faces the vibrator has a large number of cone-shaped pits for generating shock waves, the shock waves generated in the pits are converged on focal sections existing between the vibrator and the reflector, and the focal sections form an ultra strong shock wave-generating zone existing between the vibrator and the reflector.

The liquid-mixing apparatus further includes a plurality of vibrators, arranged in the vibration direction, facing one another and the vibrators adjacent to each other function as reflectors.

The vibrators have channels, extending therethrough, for allowing the mixture components to move in a meandering manner.

A liquid-mixing method according to the present invention is useful in producing a liquid mixture obtained by mixing two or more liquid components, a liquid mixture obtained by mixing a liquid component and a gas component, a liquid mixture obtained by mixing a liquid component and a powder component, or a combination of some of those liquid mixtures. The liquid-mixing method includes the steps of storing the mixture components in a vessel including a vibrator vibrating at high frequency and a reflector spaced from the vibrator at a small distance; creating cavitation bubbles in the mixture components flowing between the vibrator and the reflector using the decompression action of the vibrator allowed to move away from the reflector by high-frequency vibration transmitted from the high-frequency vibration generator to the vibrator; breaking the cavitation bubbles using the compression action of the vibrator allowed to move toward the reflector; reducing the size of the cavitation bubbles with shock wave energy generated due to the compression action; and promoting the diffusion of the mixture components to allow the liquid mixture to have an ultra fine particle size and high density.

Preferable configurations of the liquid-mixing method are described below.

When two or more liquid components are used, one of the liquid components is a fuel oil, a gas oil, a waste oil, or a waste edible oil and another one is at least one selected from the group consisting of an oil other than the above oil, alcohol, a solvent other than alcohol, and water, those components being mixed into an liquid fuel.

When a liquid component and a gas component are used, the liquid component is an edible oil or a fatty oil which contains at least one of a liquid additive and a liquid perfume, and the gas component is air, those components being mixed into a creamy food product, a cosmetic product, or a drug product.

When a liquid component and a powder component are used, the liquid component is an industrial ingredient, a food ingredient, a cosmetic ingredient, or a drug ingredient, and the powder component is a fine ceramic powder, a fine food powder, a fine cosmetic powder, or a fine drug powder that may contain an additive, those components being mixed into an industrial liquid material, a food product, a cosmetic product, or a drug product.

REFERENCE NUMERALS

1—fuel apparatus, 2—fuel, 3—fuel supply line, 4—fresh water, 4a—water particles, 5—water supply line, 6—fuel supply pump, 7—fuel flow control valve, 8—water supply pump, 9—water flow control valve, 10—emulsion fuel-producing tank, 11—liquid mixture, 12—emulsion fuel, 13—vibrating plate, 14—reflecting plate, 15—cavitation-generating zone, 15a—open end, 15b—another open end, 16—liquid-collecting member, 17—drain pipe, 18—suction pump, 19—connecting bar, 20—high-frequency vibration generator, 22—vibrator, 23—high-frequency coil, 24—high-frequency power supply unit, 25—power supply cable, 26—support arm, 27—clamping bolt, 28—static section, 29—cavitation bubbles, 30—diesel engine, 31—fuel tank, 32—water tank, 33—emulsion fuel supply line, 34—suction pump, 35—flow control valve, 36—emulsion fuel injection pump, 37a and 37b—fuel injection lines, 38—diesel engine body, 39a and 39b—cylinders, 40—engine shaft, 41—flange, 42—power generator, 43—rotary shaft, 44—transmission cable, 45—transformer, 46—output terminal, 47—power supply cable, 48—controller, 49a, 49b and 49c signal lines, 50 and 51—power supply cables, 57—channel, 58a—fuel inlet, 58b—water inlet, 59—emulsion fuel outlet, 60—flow control valve, 61—guide rod, 62—flange, 63—bolts, 64—elastic supports, 65—vibrators, 66—narrow perforations, 67—coils, 70—vessel, 71—bottom wall, 72—recessed section, 73—fasteners, 74—small perforation, 75—drain pipe, 76—valve, 81—first tank, 82—second tank, 83 and 84—mixture component-supply lines, 85 and 8—pumps, 91—third tank, 92—pump, 101—primary pre-mixing drum, 102—slurry pump, 103—liquid supply line, 104—filter, 105—pump, 110—pits, 111—focal sections, 112—ultra strong shock wave-generating region, b—reflected waves, c—shock waves

BEST MODE FOR CARRYING OUT THE INVENTION

Embodiments of the present invention will be described hereunder with reference to the accompanying drawings.

[First Embodiment (FIGS. 1 to 5)]

This embodiment provides a liquid-mixing apparatus for and a liquid-mixing method of mixing two liquid components. In particular, there are described a fuel apparatus for and a fuel-producing method of producing an emulsion fuel by mixing two liquid components, in which one is a liquid fuel such as a fuel oil or a gas oil and the other one is water.

Figure 1:
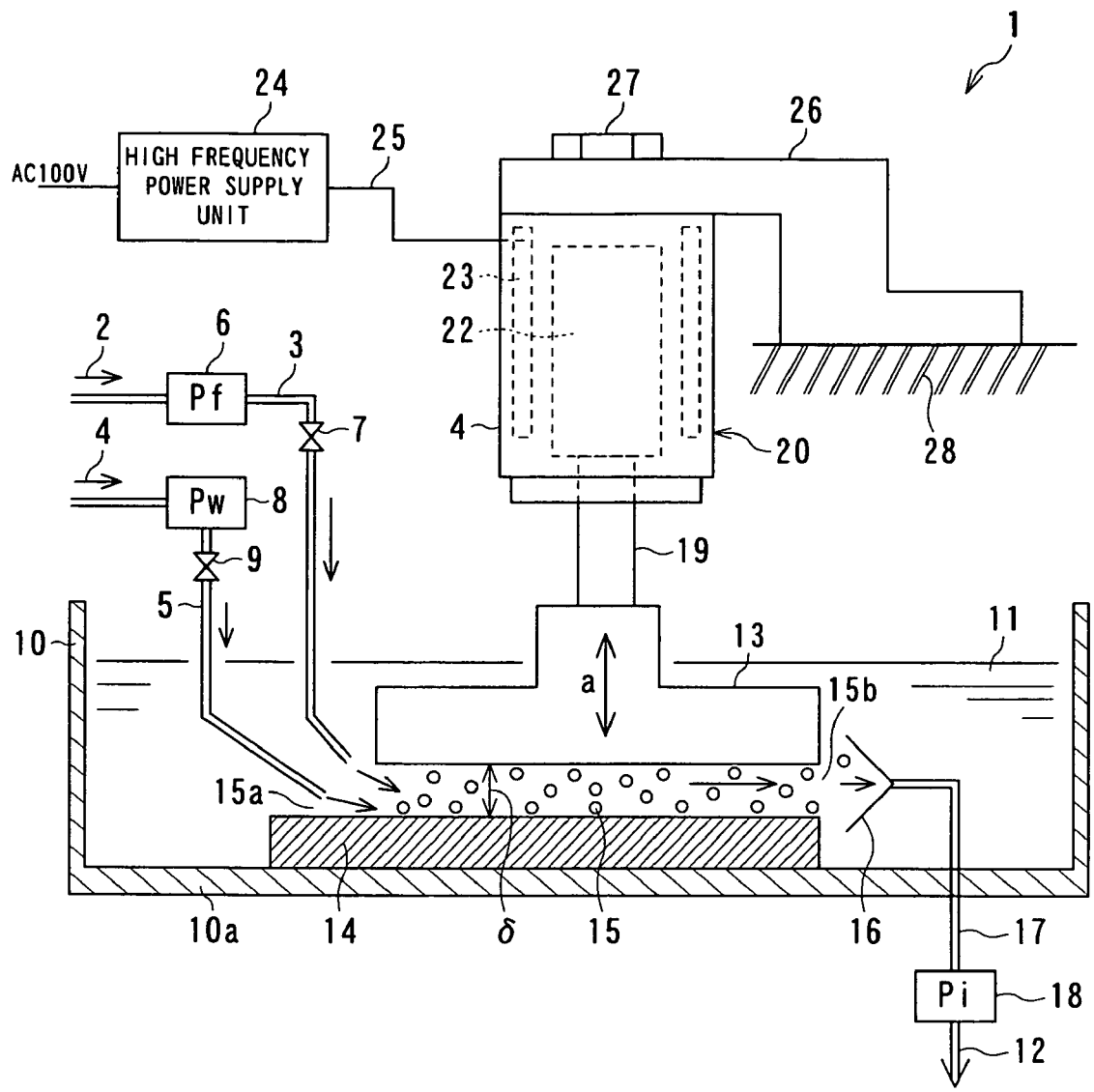
FIG. 1 is an illustration showing a configuration of a fuel apparatus according to a first embodiment of the present invention.

FIG. 1 is a schematic view showing a configuration of the fuel apparatus of this embodiment. FIGS. 2 to 5 are illustrations for explaining functions of the first embodiment.

With reference to FIG. 1, the liquid-mixing apparatus (fuel apparatus) 1 of this embodiment includes a fuel supply line 3 for supplying a liquid fuel (hereinafter simply referred to as "fuel") 2 such as gas oil and also includes a water supply line 5 for supplying liquid, such as water (referred to as "fresh water" in this embodiment) 4, incompatible with the fuel.

A proximal (base) end of the fuel supply line 3 is connected to a fuel tank, which is not shown, and the fuel supply line 3 includes a fuel supply pump 6 and a fuel flow control valve 7. The fuel supply pump 6 and the fuel flow control valve 7 are connected to a control unit, which is not shown, and used for supplying a predetermined amount of the fuel necessary for producing the emulsion fuel as described hereinafter.

Similarly, a proximal (base) end of the water supply line 5 is connected to a water tank, which is not shown, and the water supply line 5 includes a water supply pump 8 and a water flow control valve 9. The water supply pump 8 and the water flow control valve 9 are connected to another control unit, which is not shown, and used for supplying a predetermined amount of the fresh water necessary for producing the emulsion fuel as described hereinafter.

The distal (front) end of the fuel supply line 3 and the distal (front) end of the water supply line 5 are placed close to each other in an emulsion fuel-producing tank 10 and these distal ends form a mixture component inlet. The fuel supply line 3 and the water supply line 5 vertically extend and then incline downward, and the distal ends thereof are opened obliquely downward as shown in FIG. 1.

The emulsion fuel-producing tank 10 temporarily stores a liquid mixture 11 containing the fuel 2 supplied through the fuel supply line 3 and the fresh water 4 supplied through the water supply line 5. In the emulsion fuel-producing tank 10, the fresh water 4 is dispersed in the fuel 2 and mixed therewith into the liquid mixture 11, which is converted into an emulsion fuel 12 having an ultra fine particle size and high mixture density.

The emulsion fuel-producing tank 10 is placed substantially horizontally, has a flat rectangular parallelepiped shape forming a sealed tank structure (an upper portion of a sealed tank wall is omitted as shown in FIG. 1). The emulsion fuel-producing tank 10 contains a vibrating plate 13, horizontally placed at an upper area thereof, functioning as a vibrator and a reflecting plate 14, horizontally placed at a lower area thereof, functioning as a reflector. The reflecting plate 14 faces the lower face of the vibrating plate 13. A narrow space, for example, a space δ with a size of 10 mm or less and particularly several millimeters is present between the vibrating plate 13 and the reflecting plate 14. This space is referred to as a cavitation-generating zone 15. The cavitation-generating zone 15 has a lateral open end at which the distal ends of the fuel supply line 3 and the fresh water 4 are arranged. The liquid mixture 11 containing the fuel 2 and the fresh water 4 is introduced into the cavitation-generating zone 15 through the lateral open end 15a.

The cavitation-generating zone 15 has another lateral open end 15b. A funnel-shaped liquid-collecting member 16 with a wide mouth and a narrow mouth is laterally placed close to the lateral open end 15b in such a manner that the wide mouth faces the cavitation-generating zone 15. The narrow moth of the liquid-collecting member 16 is connected to a drain pipe 17 and these components form a liquid mixture outlet. The drain pipe 17 extends through a wall, for example, a bottom wall 10a of the emulsion fuel-producing tank 10 perpendicularly to the bottom wall 10a to further extend out of the emulsion fuel-producing tank 10. The drain pipe 17 is connected to a suction pump 18 through which the emulsion fuel 12 is fed to a predetermined emulsion fuel supply section.

The vibrating plate 13 and the reflecting plate 14 are formed entirely of a hard material, such as ceramic or ultra hard alloy, having high hardness, or formed partially of such material on at least a surface portion of the vibrating plate 13 facing the reflecting plate 14 and a surface portion of the reflecting plate 14 facing the vibrating plate 13.

Examples of such ceramic include alumina ($Al_2O_3$), aluminum nitride (AlN), carbon silicate (SiC), and zirconia ($ZrO_2$).

Examples of such ultra hard alloy include tungsten carbide (WC), tungsten carbide-cobalt alloys (WC—Co, WC—TiC—Co, WC—TiC—Ta—Co, and the like), and stellite.

According to the use of such material, the vibrating plate 13 and the reflecting plate 14 provide the structure having sufficient resistance to an impact due to the generation of cavitation, which will be described hereunder, and have strength sufficient to withstand cavitation damage. In order to allow only the facing surface portions of the vibrating plate 13 and the reflecting plate 14 to have high hardness, base materials made of metal or the like may be surface-treated so as to provide a hard coating made of ultra hard alloy.

The vibrating plate 13 is connected to a high-frequency vibration generator 20 through a vertical connecting bar 19 disposed therebetween and extending upward so that the vibrating plate 13 can be vibrated by the high-frequency vibration generator 20 at high frequency in the vertical direction (the direction indicated by arrows a).

The high-frequency vibration generator 20 includes a vibrator 22 which is placed in the case, made of a magnetostrictive material, and functions as a vibration source, and also includes a high-frequency coil 23 for driving the vibrator 22. High-frequency power is supplied to the high-frequency vibration generator 20 from a high-frequency power supply unit 24 through a power supply cable 25. The high-frequency power supply unit 24 converts the frequency of electricity (high frequency power) supplied from a basic power supply such as a commercial power supply, a vehicle battery or a vehicle generator to generate high-frequency power. This allows the vibrator 22, that is, a high-frequency vibration region of the vibrating plate 13 to vibrate at an ultrasonic frequency of 20 kHz or more.

The vibrator 22 of the high-frequency vibration generator 20 may include a piezoelectric element or may be made of a super magnetostrictive material. The vibrating plate 13 and the vibrator 22 may be made of the same material so as to provide an integral structure. The high-frequency vibration generator 20 is fixed to a support arm 26 with a clamping bolt 27 and the support arm 26 is fixed to a rigid static section 28.

A method of producing the emulsion fuel will be described. As shown in FIG. 1, the fuel 2 is fed to the narrow space existing between the vibrating plate 13 and the reflecting plate 14 arranged in the emulsion fuel-producing tank 10. That is, the fuel 2 is fed to the cavitation-generating zone 15 through the fuel flow control valve 7 with the fuel supply pump 6 of the fuel supply line 3. Similarly, the fresh water 4 is fed to the cavitation-generating zone 15 stored in the emulsion fuel-producing tank 10 through the water flow control valve 9 by the water supply pump 8 of the water supply line 5. This allows the cavitation-generating zone 15 and the emulsion fuel-producing tank 10 to be filled up with the mixture of the fuel 2 and the fresh water 4.

According to such structure as mentioned above, the amount of the fuel 2 discharged from the fuel supply pump 6 and the amount of the fresh water 4 discharged from the water supply pump 8 are controlled depending on the necessary amount of the emulsion fuel to be produced. The vibrating plate 13 fixed to a front end portion of the high-frequency vibration generator 20 is immersed in the liquid mixture 11, entirely, or at least at a lower surface portion thereof, containing the fuel 2 and the fresh water 4 filling the emulsion fuel-producing tank 10.

The cavitation (cavitation phenomenon) is generated in the liquid mixture 11 flowing in the cavitation-generating zone 15 by vibrating the vibrating plate 13 in the state mentioned above at a high frequency. Then, the fresh water 4 is dispersed in the fuel and mixed therewith so as to be converted into fine particles, thus forming the emulsion fuel 12 with high mixture density.

Figure 2:
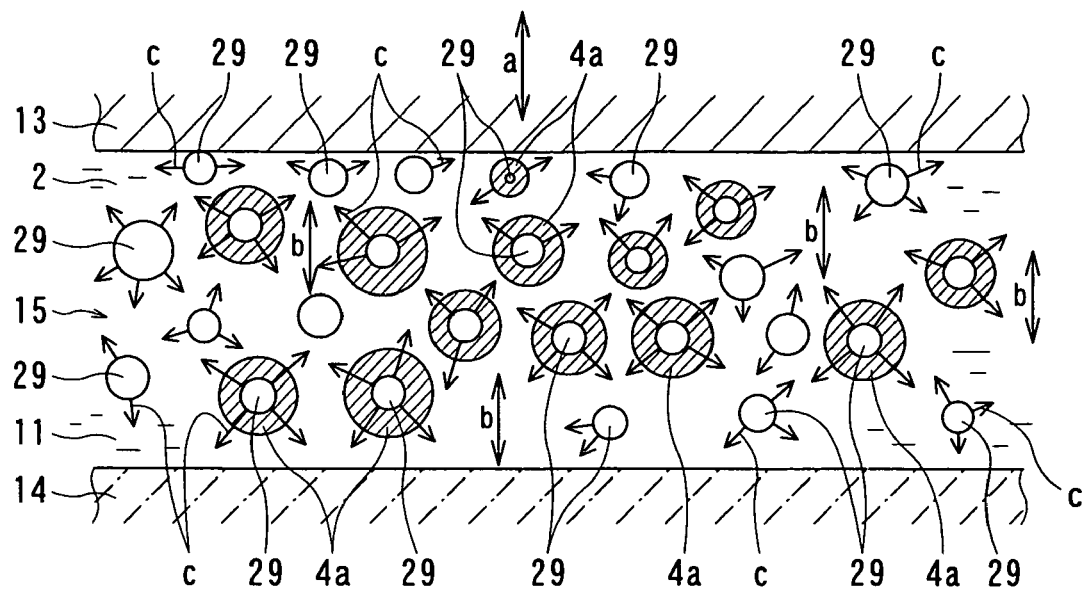
FIG. 2 is an illustration showing a mechanism of forming an emulsion fuel used in the first embodiment.

FIG. 2 is an illustration showing the mechanism of forming the emulsion fuel 12. As schematically shown in FIG. 2, the liquid mixture 11 in the emulsion fuel-producing tank 10 contains the fuel 2 and fine clusters of water particles 4a, which are converted from the fresh water 4 and dispersed in the fuel 2. The liquid mixture 11 flowing in the narrow space between the vibrating plate 13 and the reflecting plate 14 is as the same as above.

In such a situation, when the vibrating plate 13 is moved upward in parallel to the vibration direction a, a negative pressure field is instantaneously created in the narrow space between the vibrating plate 13 and the reflecting plate 14. Bubbles, that is, cavitation bubbles 29 are created due to the negative pressure in the liquid mixture 11. A large number of the cavitation bubbles 29 are created in the fuel 2 and the clustered water particles 4a dispersed in the fresh water 4.

When the vibrating plate 13 is then instantaneously moved downward due to high frequency vibration, a high pressure field is created in contrast to the above situation and the cavitation bubbles 29 are broken due to the high pressure. When the cavitation bubbles 29 are broken, high pressure shock waves (shock waves, created at the bubble collapse, indicated by arrows c) are created. The shock waves c have energy sufficient to break the clustered water particles 4a. When the cavitation bubbles 29 created in the water particles 4a are broken in particular, outward energy sufficient to burst the water particles 4a is created, whereby the water particles 4a are crushed into smaller pieces. The shock waves c are reflected between the vibrating plate 13 and the reflecting plate 14, whereby reflected shock waves (hereinafter simply referred to as "reflected waves", which are indicated by Arrows B) are created. The reflected waves acting as shock waves repeatedly hit the fuel 2 and the fresh water 4 (water particles 4a).

That is, when the vibrating plate 13 is vibrated in the liquid mixture 11 containing the fuel 2 and the fresh water 4 at high frequency, the fine cavitation bubbles 29 are repeatedly created or broken due to the high-speed reciprocation of the vibrating plate 13.

Figure 3:
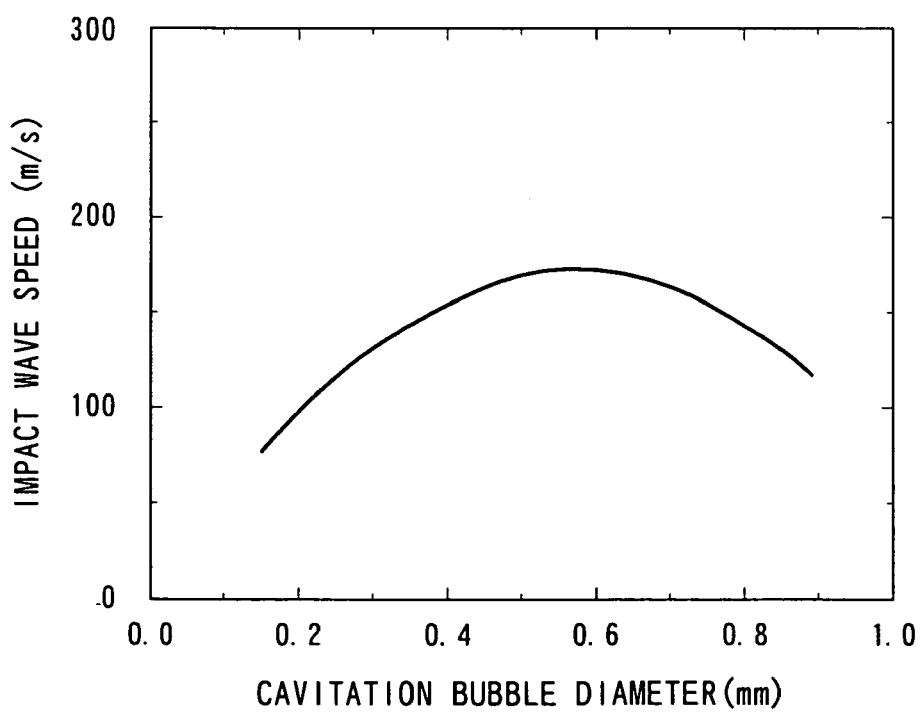
FIG. 3 is an illustration showing a mechanism of forming the emulsion fuel used in the first embodiment.

FIG. 3 is a graph showing the relationship between the speed (given by the vertical axis and shown in m/s) of the shock waves created by the collapse of the cavitation bubbles created by the vibration of the vibrating plate 13 and the diameter (given by the horizontal axis and shown in mm) of the fine cavitation bubbles 29 created or broken due to the reciprocation of the vibrating plate 13. FIG. 3 shows that the shock waves are propagated at a speed of about 100 to 200 m/s when the vibrating plate 13 is vibrated at an appropriate frequency and the fine cavitation bubbles 29 with a diameter of 0.2 to 0.8 mm are created or broken.

The collapse of the cavitation bubbles 29 leads to a generation of high impact pressure, which reaches several hundred MPa depending on conditions. In the apparatus of this embodiment, it has been clearly observed that the impact pressure reaches several hundred MPa when supersonic vibration is generated.

Figure 4:
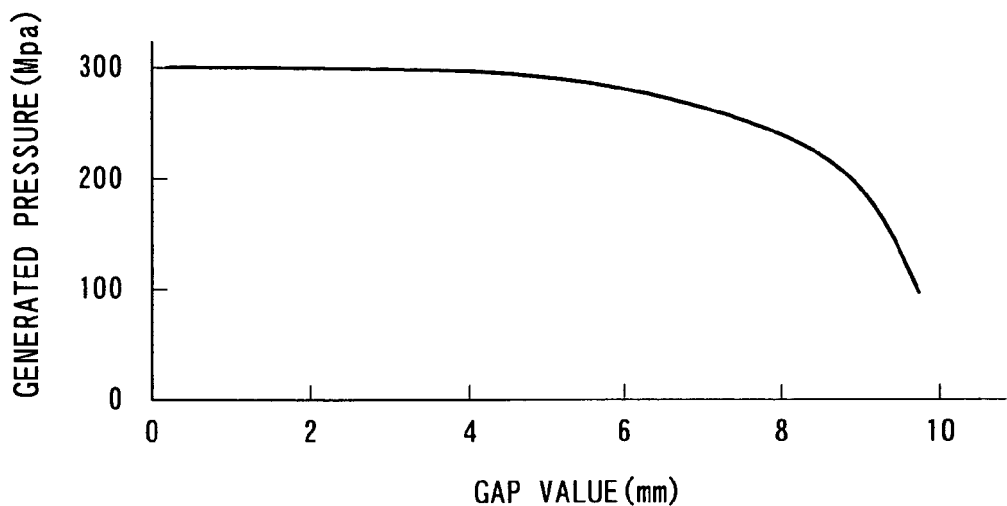
FIG. 4 is an illustration showing the mechanism of forming the emulsion fuel used in the first embodiment.

FIG. 4 is a graph showing the relationship between the size (given by the horizontal axis and shown in mm) of the space between the vibrating plate 13 and the reflecting plate 14 and the pressure (given by the vertical axis and shown in MPa) generated in the cavitation-generating zone 15 therebetween, the graph being based on measured values. FIG. 4 shows that the pressure generated is controlled in the range of 100 to 300 MPa in a case that the size of the space between the vibrating plate 13 and the reflecting plate 14 is equal to 10 mm or less.

The shock waves c generated in the cavitation-generating zone 15 by the collapse of the cavitation bubbles 29 and the reflected waves b created from the shock waves c hit the fuel 2. Therefore, when the vibrating plate 13 is vibrated at an ultrasonic frequency of 20 kHz or more, molecular clusters in the fuel 2, which is a polymeric liquid, are reduced in size by the vibration. That is, large molecular chains of the fuel 2 are physically broken into smaller chains by the synergistic effect of the impact pressure of the cavitation generated by the supersonic vibration of the vibrating plate 13 and the decomposition of the clusters by the supersonic vibration, whereby the fuel 2 is reformed.

Figure 5:
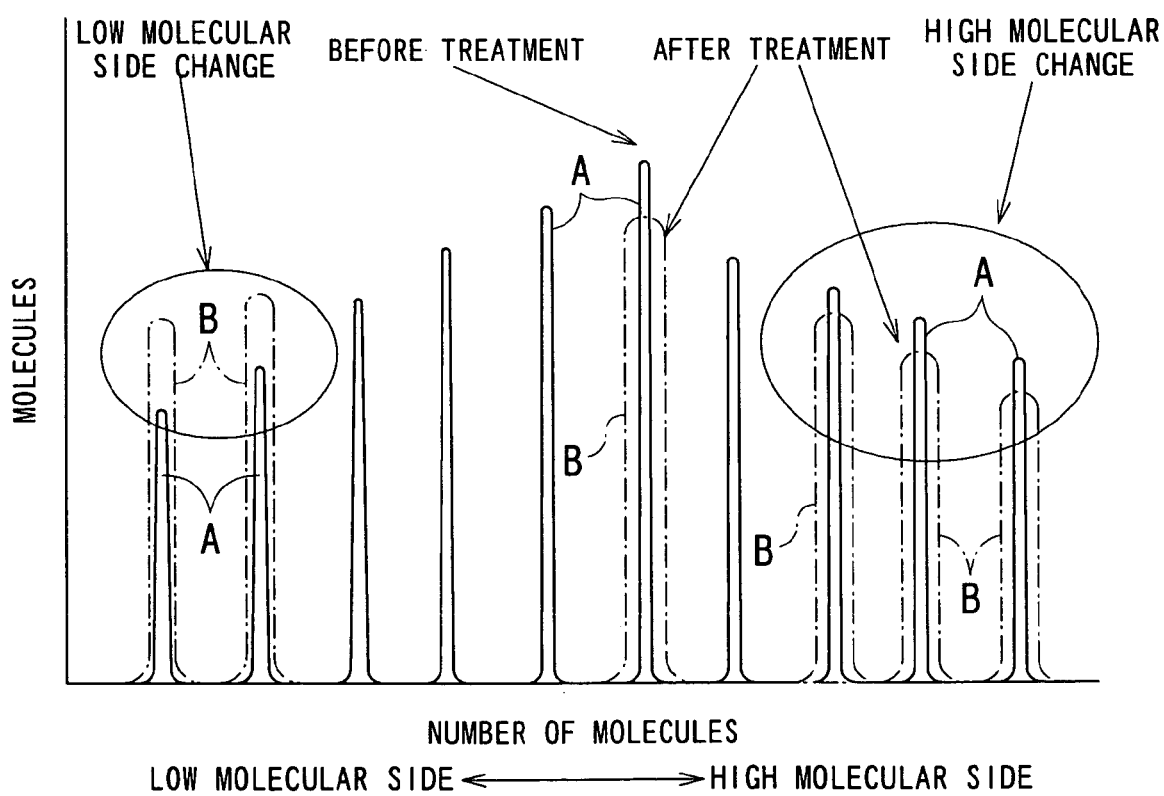
FIG. 5 is a graph showing measured data of a reformed fuel used in the first embodiment.

FIG. 5 is a graph showing the results of analysis of the gas oil which is used as an example of the fuel 2 and has components being reformed in the cavitation-generating zone 15. With reference to FIG. 5, the horizontal axis shows the number of molecules of the gas oil and the vertical axis shows the molecular weight. For the fuel before the treatment (untreated) with cavitation, the number of high molecular weight molecules is larger than that of low molecular weight molecules, as shown with characteristic curve A which is a histogram shown as a solid line in FIG. 5.

On the other hand, high molecular weight molecules of the fuel treated with cavitation are less in number than those of the untreated fuel and low molecular weight molecules of the treated fuel are greater in number than those of the untreated fuel, as shown with characteristic curve B which is a histogram shown as a broken line in FIG. 5. This means that some of the high molecular weight molecules of the untreated fuel are broken into low molecular weight molecules, whereby the number of the low molecular weight molecules is increased. That is, the fuel 2 is converted into a more combustible fuel by mixing the fuel 2 with the fresh water 4 and by cracking the fuel 2 using the reflected waves b and the shock waves c created by the cavitation.

The cracked fuel 2 and the fine water particles 4a are further stirred and mixed by the cavitation, promoting the diffusion and mixing. This leads to the formation of the emulsion fuel 12 having an ultra fine particle size and high mixture density. If the supplies of the fuel 2 and the fresh water 4 are maintained constant, the fuel 2 and the fresh water 4 are mixed at a predetermined ratio, whereby a uniform high-quality emulsion fuel with a fine particle size can be produced.

As described above, in the apparatus of this embodiment including the cavitation-generating zone 15 having a height of several millimeters in cross section, since the reflected waves b and the shock waves c created by the collapse of the cavitation bubbles 29 are not diffused but confined, a high-density shock wave field can be formed and maintained. The fresh water 4 is converted into fine particles by the shock waves and the fine particles are repeatedly mixed with the fuel 2, whereby the emulsion fuel containing the water particles are uniformly dispersed therein. Experiment results show that substantially the same advantage as that described above can be achieved if the space size is increased up to 10 mm.

As shown in FIG. 1, the emulsion fuel 12 produced is collected with the funnel-shaped liquid-collecting member 16 attached to a right end of the cavitation-generating zone 15, is drained out of the emulsion fuel-producing tank 10 through the drain pipe 17 with the suction pump 18 and is then fed to the next step, for example, stored in a predetermined vessel or continuously fed to a combustor.

The emulsion fuel 12 produced as described above does not easily return to its original state as long as energy higher than a certain threshold is applied thereto. Therefore, the fine water particles 4a and the cracked fuel 2 can be kept as they are over a long period of time. Hence, the emulsion fuel 12 is hardly separated into the fuel 2 and the fresh water 4 if the emulsion fuel 12 is stored for a long time. There is no problem in that the emulsion fuel 12 is deteriorated in quality when it is fed to next equipment such as a combustor. The emulsion fuel has high quality and can be used for various combustors such as diesel engines and boilers.

When the emulsion fuel 12 produced by the method of this embodiment is fed to a combustor such as a diesel engine, a boiler, or another combustion unit and then burned therein, the combustion temperature is low because the fuel has a fine particle size and high mixture density and the fuel 2 and the fresh water 4 are mixed uniformly and fully at a predetermined ratio, that is, the fuel has high quality. Furthermore, any unburned matter hardly remains because of the following reasons or functions. That is, water in the fuel is converted into steam, a portion of the steam is separated to create a small explosion (microexplosion), and the mixing of the fuel with air is enhanced by atomizing the fuel by the force of the explosion, thus promoting the combustion. Therefore, the amount of unburned products, so-called dust such as black smoke, is greatly reduced in spite of the fact that the unburned products are created by incomplete combustion when a conventional fuel is burned. Furthermore, since the emulsion fuel 12 produced by the method of this embodiment can be burned at low temperature, hazardous chemical compounds such as NOx are hardly created during the combustion. This leads to a great reduction in the amount of such hazardous chemical compounds such as NOx and dust such as black smoke, thereby efficiently preventing air pollution.

According to this embodiment, the fuel emulsification can be efficiently performed with the simple, small-sized apparatus, and the emulsion fuel having an ultra fine particle size and high mixture density can be produced. If the emulsion fuel is stored for a long time, the fuel and liquid are not separated from each other. The apparatus of this embodiment is simpler and smaller in size as compared with known equipment including a screw-type agitating member. Complicated components are not necessary for the apparatus, which can therefore be actually used for combustors with ease.

In the first embodiment, the fuel 2 and the fresh water 4 are uniformly stirred and mixed. Such a procedure is the most preferable one and water, such as wastewater, other than the fresh water may be used according to needs. In addition to water, another liquid, for example, an emulsifier such as a surfactant suitable for burning fuel may be used.

[Second Embodiment (FIGS. 6 to 8)]

A second embodiment of the present invention provides a liquid-mixing apparatus and liquid-mixing method of mixing two liquid components. In particular, there is provided an apparatus including a vessel for producing a liquid mixture, the vessel being equipped with a vibrator and a reflector having one or more perforations which extend through a center area of the reflector and perform a function as mixture component inlets through which mixture components are introduced into a space between the vibrator and the reflector. Furthermore, there is also provided a method of producing an emulsion fuel or a reformed liquid fuel by mixing two liquid components. One is a fuel oil, a gas oil, a waste oil, or a waste edible oil and the other one is an oil other than the above oil, alcohol, or solvent other than alcohol.

Figure 6:
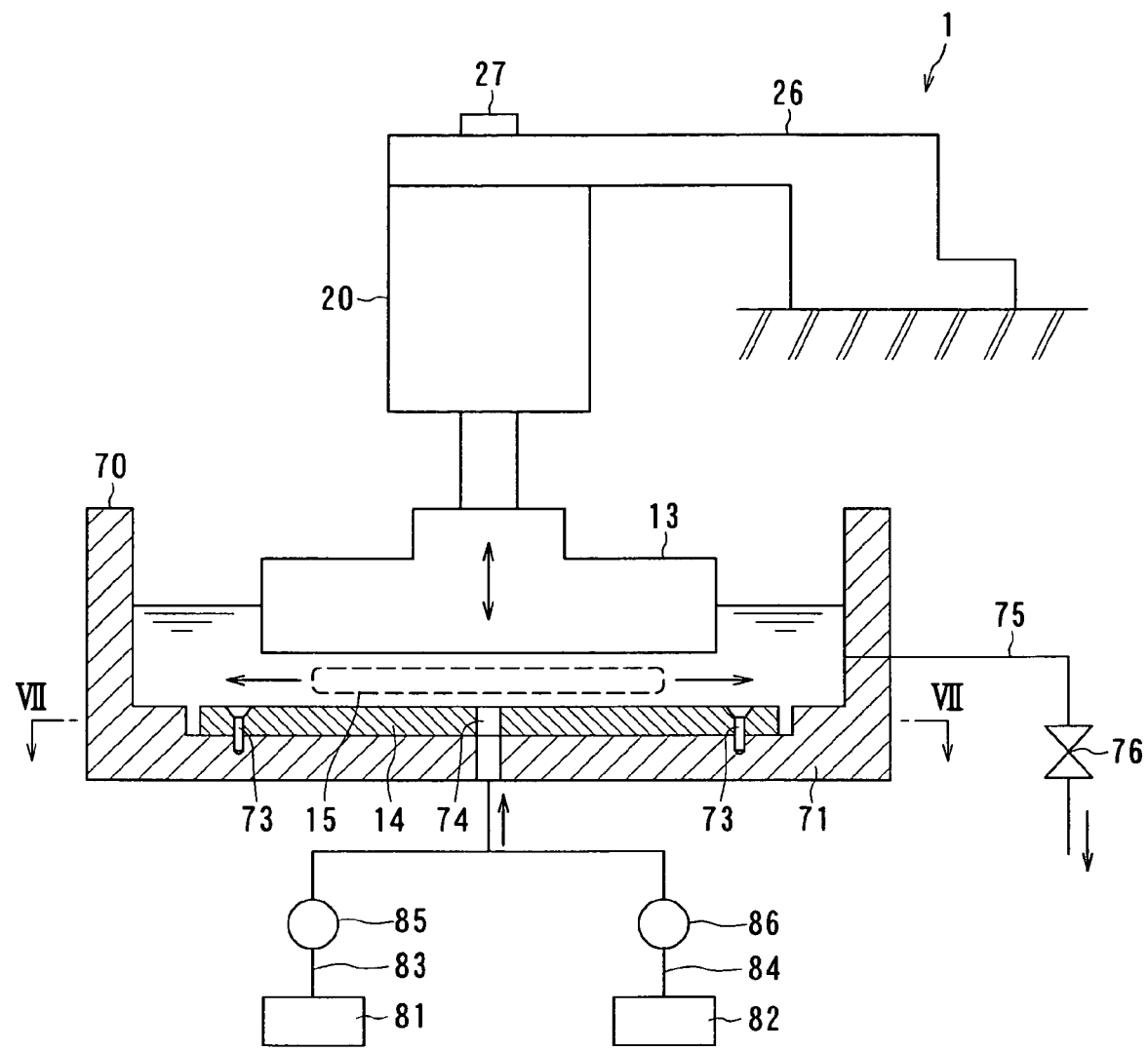
FIG. 6 is an illustration showing a configuration of a liquid-mixing apparatus according to a second embodiment of the present invention.

A liquid-mixing apparatus 1 of this second embodiment has substantially the same basic configuration as that of the apparatus of the first embodiment. With reference to FIG. 6, a circular vibrating plate 13 is connected to a vibration generator 20 and horizontally placed at substantially the center of a vessel 70 for mixing liquids when viewed in a plan view. A reflecting plate 14 is horizontally placed below the vibrating plate 13 with a narrow space existing therebetween.

The vessel 70 includes a bottom wall 71 having a recessed section 72, located at a center area thereof, having an open top and a circular shape when viewed in a plan view. The reflecting plate 14 is fitted in the recessed section 72 in such a manner that a surface (the upper surface) of the reflecting plate 14 is flush with the bottom surface of the vessel 70. End portions of the reflecting plate 14 are detachably fixed to the vessel 70 with fasteners 73 such as bolts. The reflecting plate 14 can be readily replaced with another one after the reflecting plate 14 has been used for a long time and therefore worn out.

Figure 7:
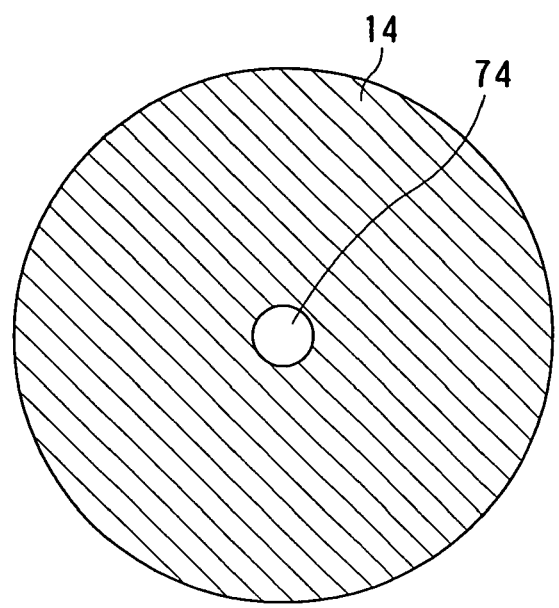
FIG. 7 is a sectional view showing the apparatus of the second embodiment of the present invention.

With reference to FIGS. 6 and 7, the reflecting plate 14 has, for example, a single small perforation 74, located at substantially the center thereof, vertically extending therethrough. The small perforation 74 acts as an inlet for introducing mixture components. The vessel 70 includes a drain pipe 75, having a valve 76, for draining a liquid mixture.

Figure 8:
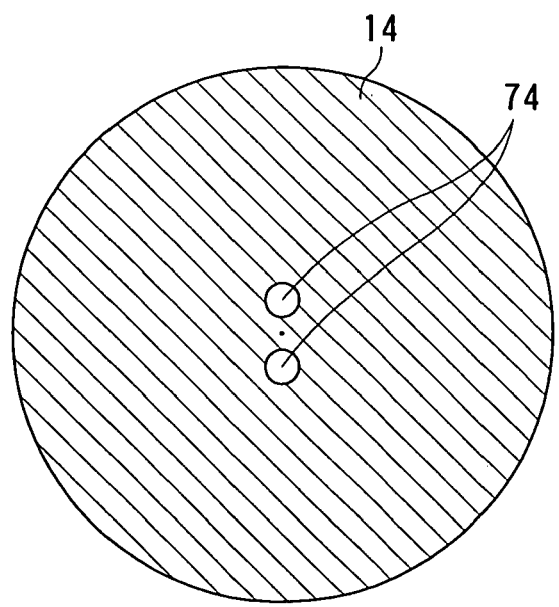
FIG. 8 is a sectional view showing a modification of the apparatus of the second embodiment of the present invention.

The reflecting plate 14 need not necessarily has the single small perforation 74 but may have two small perforations 74 as shown in FIG. 8 or more numbers of small perforations 74 although not shown in figures.

The apparatus of this second embodiment includes a first tank 81 and a second tank 82 acting as sources for supplying respective two liquids.

The first tank 81 contains an oil fuel such as a fuel oil, a gas oil, a waste oil (for example, engine oil), or a waste edible oil. The second tank 82 contains, for example, an oil other than the oil contained in the first tank 81 (the second tank 82 may contain a gas oil, a waste oil, or a waste edible oil when the first tank 81 contains a fuel oil), alcohol, solvent (for example, an aromatic solvent such as thinner) other than alcohol, or another combustible liquid component.

These tanks 81 and 82 are connected to mixture component supply lines 83 and 84, respectively, which have pumps 85 and 86. The mixture component supply lines 83 and 84 are joined into a single pipe at a portion downstream of the pumps 85 and 86 and the single pipe rises vertically so as to extend through a center area of the lower face of the vessel 70. That is, the mixture component supply lines 83 and 84 extend upward to substantially the center of the bottom wall of the vessel 70 perpendicularly to the bottom wall and perforate through the bottom wall, and end portions of the lines extend in the small perforation 74 located at the center of the reflecting plate 14. Fuel and the like as the liquid components are fed upward to a cavitation-generating zone 15 that is a narrow space between the vibrating plate 13 and the reflecting plate 14 from the end portions thereof perpendicularly to the cavitation-generating zone 15. That is, the fuel and the like, which are liquid components, are led upward to substantially the center of the bottom wall of the vessel 70 perpendicularly to the bottom wall and then fed to the cavitation-generating zone 15 between the vibrating plate 13 and the reflecting plate 14 through the small perforation 74 located at the center of the reflecting plate 14.

In this embodiment, materials for forming the vibrating plate 13 and the reflecting plate 14, the size of the space between the vibrating plate 13 and the reflecting plate 14, the configuration of the high-frequency vibration generator 20, configurations of other components, and the like are substantially the same as those described in the first embodiment. Accordingly, the same components shown in FIG. 6 as those shown in FIG. 1 have the same reference numerals and descriptions about the components are omitted herein.

When the liquid components are mixed, the liquid components separately stored in the first or second tank 81 or 82 are discharged therefrom with the pumps 85 and 86 and then combined into a mixture, which is fed into the small perforation 74 of the reflecting plate 14 through the bottom wall of the vessel 70 and then injected in the cavitation-generating zone 15 through the small perforation 74. The fuel and the like, or the liquid components are converted into an emulsion having a fine particle size in the cavitation-generating zone 15 with strong shock waves created by the vibration of the vibrating plate 13. In this embodiment, since the distance between the vibrating plate 13 and the reflecting plate 14 placed on the vessel bottom is small, the shock waves created in the cavitation-generating zone 15 can be more readily applied to the liquid components as compared with a technique in which raw materials are fed to a side portion of the space between the vibrating plate 13 and the reflecting plate 14. Therefore, the liquid components can be converted into an emulsion with a more fine particle size.

Thus, according to this embodiment, an emulsion fuel with a fine particle size can be produced using a fuel oil, a gas oil, a waste oil, or a waste edible oil fed from the first tank 81 and oil, alcohol, or solvent other than alcohol fed from the second tank 82.

A fuel mixture suitable for internal combustion engines and gas turbine combustors can be produced by mixing fuel oil and gasoline other than the above combination of those types of oil fuel.

[Third Embodiment (FIG. 9)]

Figure 9:
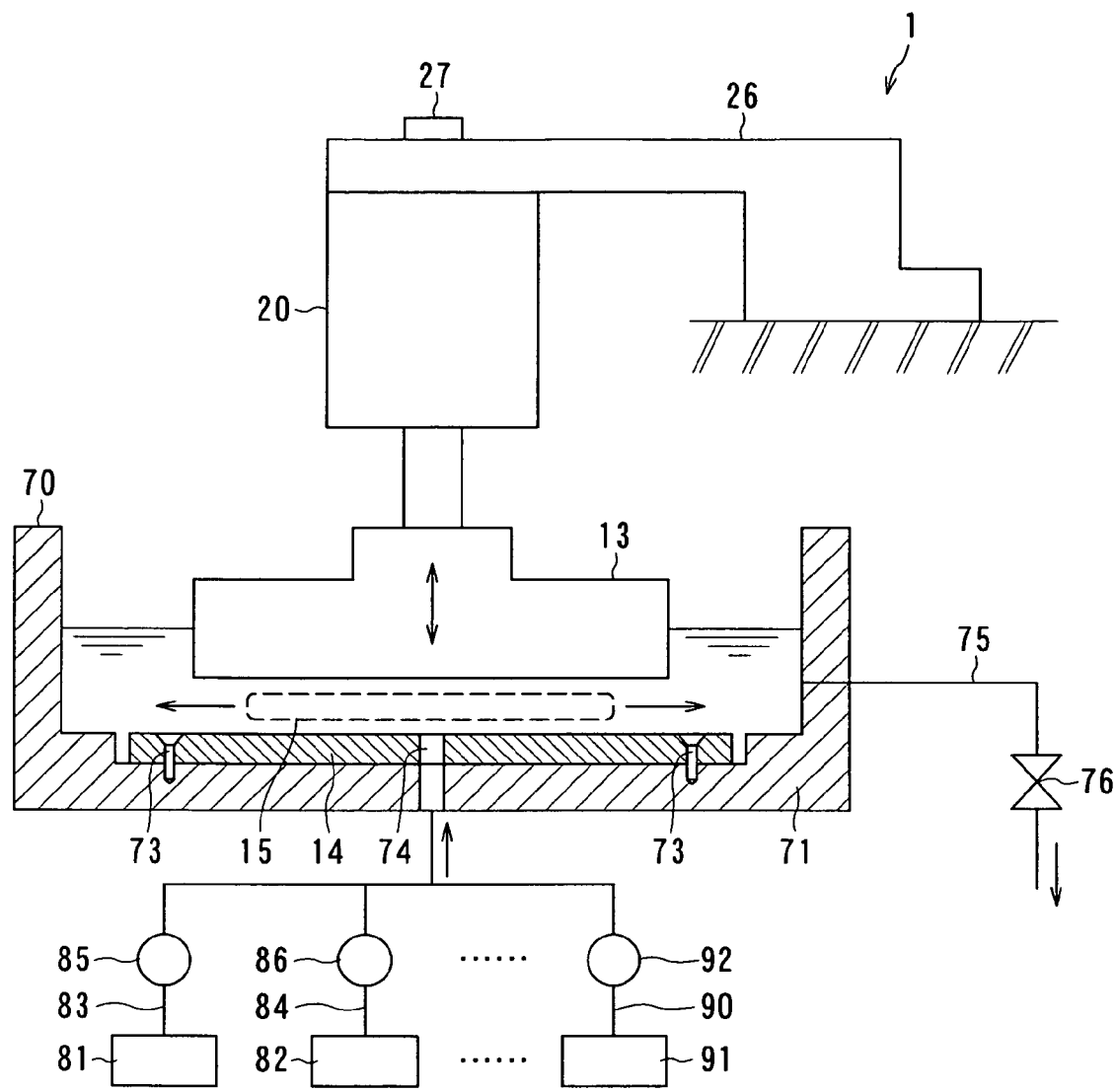
FIG. 9 is an illustration showing a configuration of a liquid-mixing apparatus according to a third embodiment of the present invention.

A third embodiment of the present invention provides a liquid-mixing apparatus and liquid-mixing method of mixing at least three liquids. FIG. 9 is an illustration showing a configuration of the liquid-mixing apparatus of the third embodiment. The configuration of this embodiment is substantially the same as that of the second embodiment except the arrangement of lines for supplying liquid mixture components. The same components shown in FIG. 9 as those shown in FIG. 6 have the same reference numerals and descriptions about the components are omitted.

With reference to FIG. 9, the apparatus of this embodiment includes a first tank 81, a second tank 82, and a third tank 91 acting as sources for supplying respective three different liquids.

The first tank 81 contains an oil fuel such as a fuel oil, a gas oil, a waste oil (for example, engine oil), or a waste edible oil.

The second tank 82 contains, for example, an oil other than the oil contained in the first tank 81 (the second tank 82 may contain a gas oil, a waste oil, or a waste edible oil when the first tank 81 contains a fuel oil), alcohol, solvent (for example, an aromatic solvent such as thinner) other than alcohol, or water.

The third tank 91 contains an emulsifier, such as liquid soap, acting as a surface active agent, i.e., surfactant.

The first, second, and third tanks 81, 82, and 91 are connected to three supply lines of mixture component supply lines 83, 84, and 90, which are provided with pumps 85, 86, and 92, respectively. The mixture component supply lines 83, 84, and 90 are joined into a single pipe at a portion downstream of the pumps 85, 86 and 92, and the single pipe rises vertically so as to extend through a center area of the lower surface of a vessel 70. That is, those mixture component supply lines extend upward to substantially the center of a bottom wall of the vessel 70 perpendicularly to the bottom wall and perforate through the bottom wall, and end portions of the lines extend through a center area of a reflecting plate 14. Fuel and the like, which are liquid components, are fed upward to a cavitation-generating zone 15 having a narrow space between a vibrating plate 13 and the reflecting plate 14 from the end portions thereof perpendicularly to the cavitation-generating zone 15.

Similar to the second embodiment, when the liquid components are mixed, the liquid components separately stored in the first, second, or third tank 81, 82 and 91 are discharged therefrom with the pumps 85, 86 and 92 and then combined into a mixture, which is fed into a small perforation 74 formed to reflecting plate 14 through the bottom wall of the vessel 70 and then injected in the cavitation-generating zone 15 through the small perforation 74. The fuel and the like, or the liquid components are converted into an emulsion having a fine particle size in the cavitation-generating zone 15 with strong shock waves created by the vibration of the vibrating plate 13. In this third embodiment, since the distance between the vibrating plate 13 and the reflecting plate 14 placed on the vessel bottom is small, the shock waves created in the cavitation-generating area can be more readily applied to the liquid components as compared with an arrangement in which raw materials are fed to a side portion of the space between the vibrating plate 13 and the reflecting plate 14. Therefore, the liquid components can be converted into an emulsion with a more fine particle size.

In the above description, the three different liquids are used as raw materials. Four different liquids can also be readily mixed using increased number of tanks and supply lines.

According to this third embodiment, the shock waves created by cavitation can be effectively applied to three or more liquid components, fed through the small perforation 74, having different densities, whereby an emulsion fuel with a fine particle size can be produced using various mixture components.

[Fourth Embodiment (FIG. 10)]

Figure 10:
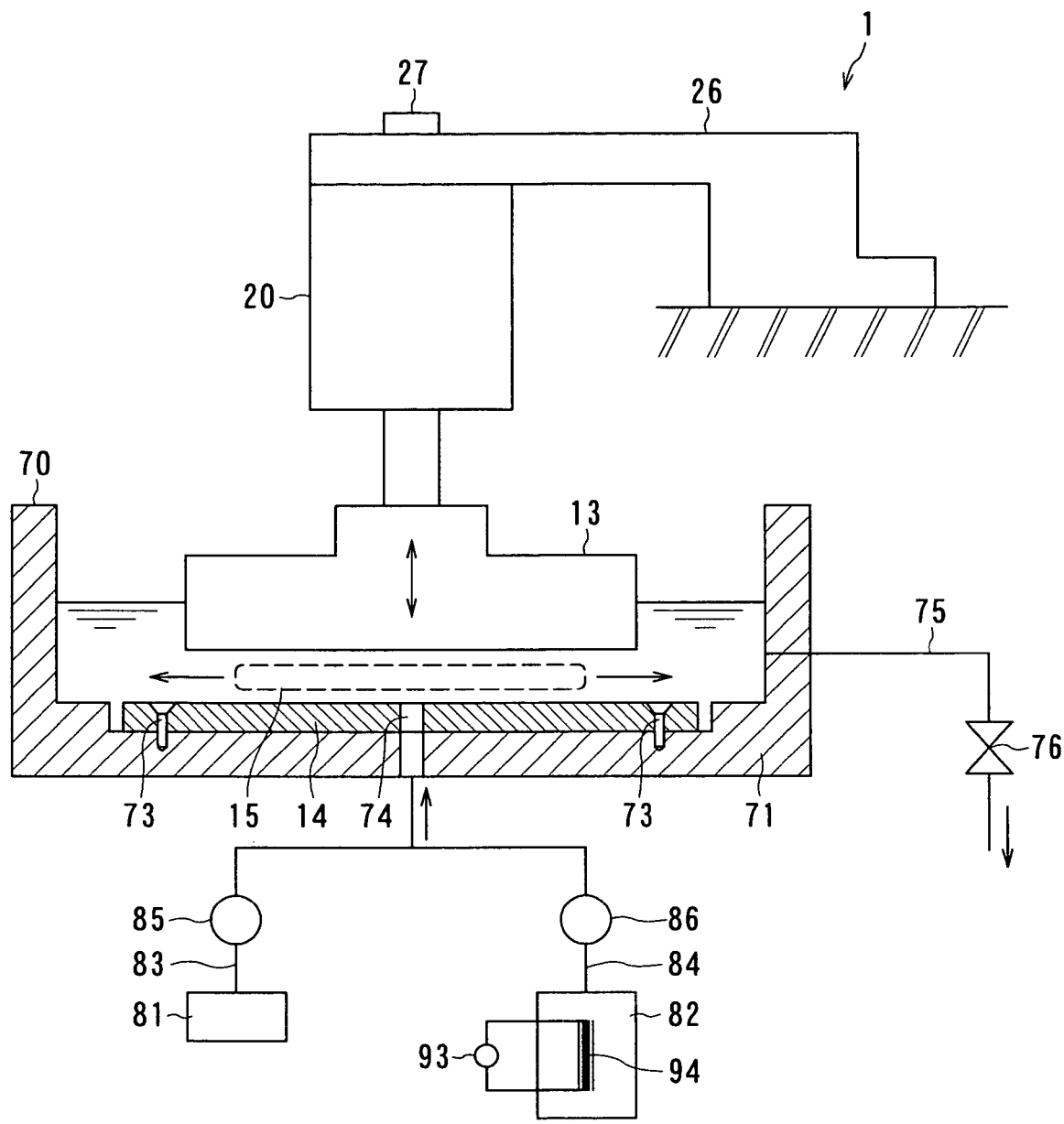
FIG. 10 is an illustration showing a configuration of a liquid-mixing apparatus according to a fourth embodiment of the present invention.

A fourth embodiment of the present invention provides a liquid-mixing apparatus and liquid-mixing method of producing a mixture containing a high-viscosity liquid. FIG. 10 is an illustration showing a configuration of the liquid-mixing apparatus of this fourth embodiment. The configuration of this embodiment is substantially the same as that of the second embodiment except an arrangement of lines for supplying liquid mixture components. The same components shown in FIG. 10 as those shown in FIG. 6 have the same reference numerals and descriptions about the components are omitted.

With reference to FIG. 10, the apparatus of this embodiment includes a first tank 81 and a second tank 82 acting as sources for supplying respective two different liquids.

The first tank 81, as well as that described in the second embodiment, contains an oil fuel such as a fuel oil, a gas oil, a waste oil (for example, an engine oil), or a waste edible oil.

The second tank 82 contains grease with high viscosity, alcohol, or solvent (for example, an aromatic solvent such as thinner) other than alcohol. The second tank 82 is provided with a heater 94, connected to a power supply 93, for heating a high-viscosity liquid such as grease.

In general, an increase in temperature reduces the viscosity of liquid with high viscosity, and hence, a heated high-viscosity liquid has high fluidity. When the viscosity is extremely high, cavitation can hardly be generated even if a vibrating plate 13 is vibrated at high frequency. Therefore, in this embodiment, the heater 94 is used to decrease the viscosity, thus feeding liquid with high fluidity to a cavitation-generating zone.

In this embodiment, the first and second tanks 81 and 82 are connected to mixture component supply lines, which have pumps 85 and 86, respectively. The mixture component supply lines 83 and 84 are joined into a single pipe downstream of the pumps 85 and 86 and the single pipe rises vertically so as to extend through a center area of the lower surface of a vessel 70. That is, the mixture component-supply lines 83 and 84 extend upward to substantially the center of a bottom wall of the vessel 70 perpendicularly to the bottom wall and perforate through the bottom wall, and end portions of the lines extend through a center area of a reflecting plate 14. Fuel and the like, which are liquid components, are fed to a cavitation-generating zone 15 formed as a narrow space between the vibrating plate 13 and the reflecting plate 14 from the end portions thereof upward perpendicularly to the cavitation-generating zone 15.

Similar to the second embodiment, when the liquid components are mixed, the liquid components separately stored in the first or second tank 81 or 82 are discharged therefrom with the pumps 85 and 86. In this operation, if the second tank 82 contains liquid with high viscosity, the heater 94 is turned on such that the liquid viscosity is reduced, whereby the liquid with reduced viscosity is fed to the cavitation-generating zone 15. Therefore, cavitation bubbles can be readily created.

[Fifth Embodiment (FIG. 11)]

Figure 11:
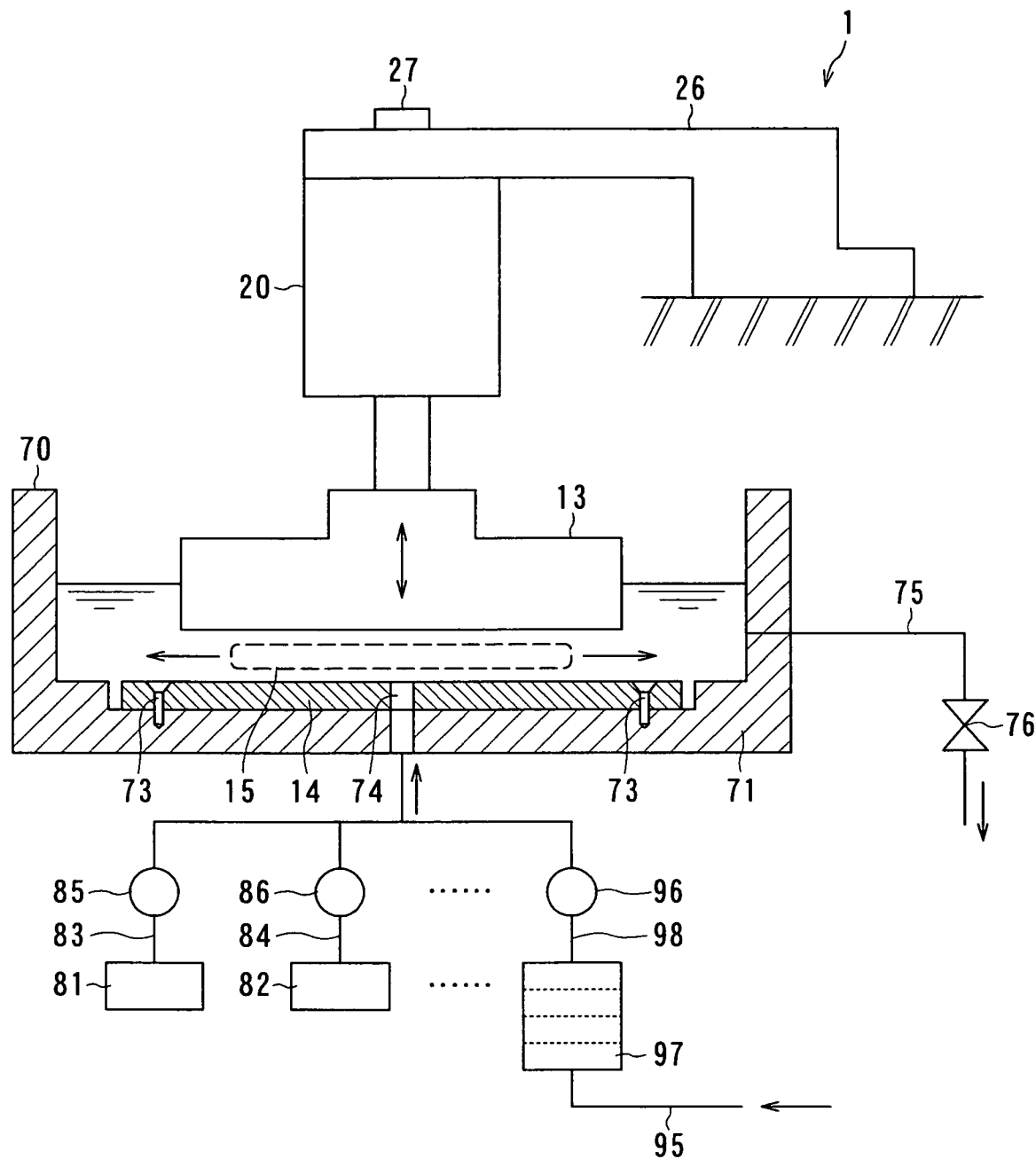
FIG. 11 is an illustration showing a configuration of a liquid-mixing apparatus according to a fifth embodiment of the present invention.

A fifth embodiment of the present invention provides a liquid-mixing apparatus and liquid-mixing method of producing a creamy liquid mixture with a fine texture. FIG. 11 is an illustration showing a configuration of the liquid-mixing apparatus of this fifth embodiment. The configuration of this embodiment is substantially the same as that of the second embodiment except an arrangement of lines for supplying liquid mixture components. The same components shown in FIG. 11 as those shown in FIG. 6 have the same reference numerals and descriptions about the components are omitted.

With reference to FIG. 11, the apparatus of this fifth embodiment is provided with, for example, a first tank 81 and a second tank 82 acting as sources for supplying respective two different liquids and further includes an air supply line 95 for supplying air.

The first tank 81 contains a liquid component such as an edible oil, a cosmetic fat, or a medicated oil. The second tank 82 contains a liquid component such as seasoning, an additive, or perfume. The first and second tanks 81 and 82 are connected to mixture component supply lines 83 and 84 which have pumps 85 and 86, respectively. An air supply line 98 has an air-cleaning filter 97 (having a sterilizer for removing microorganisms) and an air pump 96, and hence, clean air can be supplied.

The mixture component supply lines 83 and 84 and the air supply line 98 are joined into a single pipe, which rises vertically to extend through a center area of the lower surface of a vessel 70. That is, the mixture component supply lines extend upward to substantially the center of a bottom wall of the vessel 70 perpendicularly to the bottom wall and perforate through the bottom wall, and end portions of the lines extend through a center area of a reflecting plate 14. Fuel and the like, which are liquid components, are fed to a cavitation-generating zone 15 formed as a narrow space between the vibrating plate 13 and the reflecting plate 14 from the end portions thereof upward perpendicularly to the cavitation-generating zone 15.

When the liquid components are mixed, air cleaned with the air-cleaning filter 97 is mixed with the liquid components separately stored in the first or second tank 81 or 82, whereby a mixture of the air and the liquid components is supplied.

The following components are fed to the vessel 70 for mixing liquids from a bottom area: the liquid component, such as an edible oil or fat, discharged from the first tank 81; the liquid component, such as an additive or perfume, discharged from the second tank 82; and clean air from which dust and microorganisms have been removed with the air filter 97 and which is fed with the air pump 96. Those liquid components and the air are stirred and mixed with shock waves created by cavitation bubbles in the cavitation-generating zone 15.

In this fifth embodiment as well as the embodiments described hereinbefore, since the distance between the vibrating plate 13 and the reflecting plate 14 placed on the vessel bottom is small, the shock waves created in the cavitation-generating zone 15 can be more readily applied to the liquid components as compared with a technique in which raw materials are fed to a portion of the space between the vibrating plate 13 and the reflecting plate 14. Accordingly, a creamy material containing a large amount of ultra fine air bubbles can be produced, and thus, for example, creamy food products, cosmetic products, drug products, and the like can be improved in properties such as taste and texture.

In particular, the apparatus and the method of this embodiment are useful in producing mayonnaise obtained by mixing edible oil, edible vinegar, and animal or vegetable protein, cream obtained by mixing oil and air, edible powder, polysaccharide solutions, and the like.

[Six Embodiment (FIG. 12)]

Figure 12:
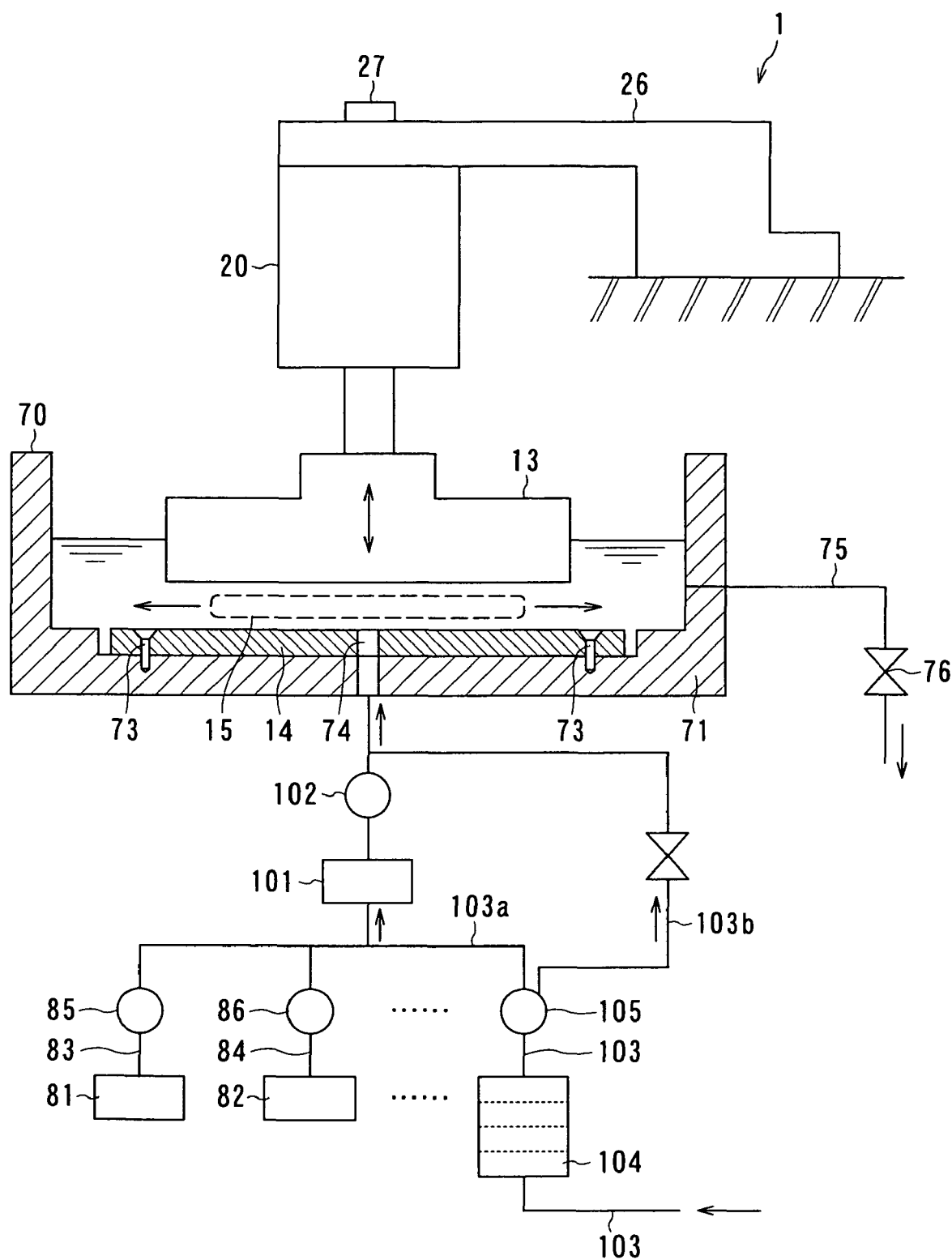
FIG. 12 is an illustration showing a configuration of a liquid-mixing apparatus according to a sixth embodiment of the present invention.

A sixth embodiment of the present invention provides a liquid-mixing apparatus and liquid-mixing method of producing a liquid mixture by mixing liquid and powder. That is, this sixth embodiment provides an arrangement for adding ceramic powder or the like to liquid or an arrangement for adding an additive to such a mixture. Such arrangement is useful in producing, for example, a dense industrial liquid, which is a liquid starting material for producing a ceramic preform, by mixing liquid and powder. FIG. 12 is an illustration showing a configuration of the liquid-mixing apparatus of this embodiment. The configuration of this embodiment is substantially the same as that of the second embodiment except an arrangement of lines for supplying liquid mixture components. The same components shown in FIG. 12 as those shown in FIG. 6 have the same reference numerals and descriptions about the components are omitted.

With reference to FIG. 12, the apparatus of this embodiment includes a first tank 81 acting as a source for supplying a ceramic powder or the like and a second tank 82 for storing an additive powder or the like and a liquid component. These tanks are connected to mixture component supply lines 83 and 84 which have pumps 85 and 86, respectively. These lines are joined into a single pipe, which has a primary pre-mixing drum 101 including, for example, a screw-type agitator and also has a slurry pump 102 disposed at a portion downstream of the primary pre-mixing drum 101.

The apparatus of this sixth embodiment is further provided with a liquid supply line 103 for supplying water or another liquid. The liquid supply line 103 is equipped with a filter 104 and a pump 105 and is split into two sub-lines downstream of the pump 105. One of the sub-lines is a first sub-line 103a, which is connected to a section located upstream of the primary pre-mixing drum 101. The other one is a second sub-line 103b, which is connected to a section located downstream of the slurry pump 102.

Similar to the second embodiment, the single pipe in which all components flow rises vertically so as to extend through a center area of the lower surface of the 70. That is, the mixture component supply lines extend upward to substantially the center of a bottom wall of the vessel 70 perpendicularly to the bottom wall and perforate through the bottom wall, and end portions of the lines extend through a center area of a reflecting plate 14. Fuel and the like, which are liquid components, are fed to a cavitation-generating zone 15 that is a narrow space between a vibrating plate 13 and the reflecting plate 14 from the end portions thereof upward perpendicularly to the cavitation-generating zone 15.

When liquids are mixed, the ceramic powder or the like stored in the first tank 81 and the additive powder or the like stored in the second tank 82 are fed to the mixing component supply lines 83 and 84, respectively. Furthermore, liquid such as clean water is fed to a section upstream of the primary pre-mixing drum 101 or a section downstream of the slurry pump 102 through the liquid supply line 103.

That is, the powder discharged from the first tank 81, the powder and liquid component discharged from the second tank 82, and the water, cleaned with the filter 104, fed through the liquid supply sub-line 103a are fed to the primary pre-mixing drum 101 and then mixed into slurry. The slurry prepared in the primary pre-mixing drum 101 is fed to the cavitation-generating zone 15 through a small perforation 74 with the slurry pump 102. In this operation, the slurry fed with the slurry pump 102 has high viscosity, water or the like may be fed to a section downstream of the slurry pump 102 through the liquid supply line 103a. This allows the mixture of the powders and the liquid component to have an appropriate viscosity.

The components in the slurry are uniformly dispersed in the liquid in a short time and then mixed by the generation of shock waves created by the cavitation bubbles in the cavitation-generating zone 15.

Thus, according to this embodiment, a high-quality pre-mixture for producing industrial powder useful in producing ceramics can be produced.

Furthermore, according to this embodiment, food products, cosmetic products, or drug products can be produced using a liquid component for industrial uses, food uses, cosmetic uses, or drug uses, and fine powder for food uses, cosmetic uses, or drug uses, and an additive used according to needs.

[Seventh Embodiment (FIGS. 13 to 16)]

Figure 13:
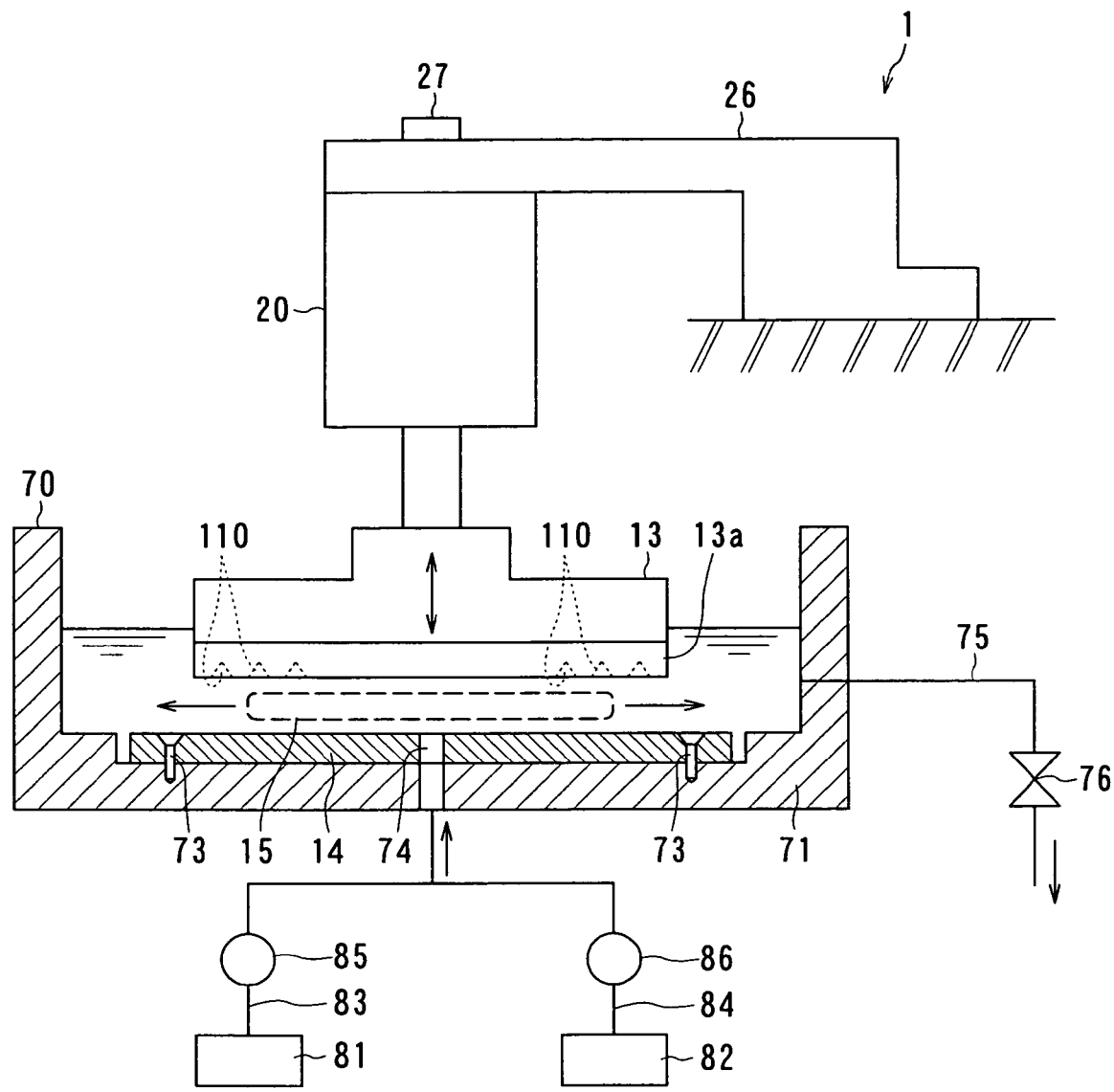
FIG. 13 is an illustration showing a configuration of a liquid-mixing apparatus according to a seventh embodiment of the present invention.
Figure 14:
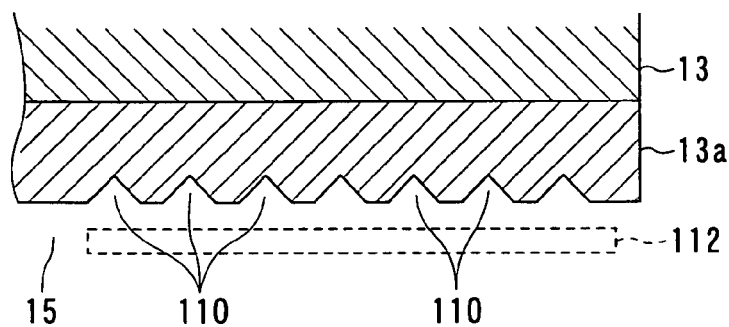
FIG. 14 is an enlarged sectional view showing the apparatus shown in FIG. 13.
Figure 15:
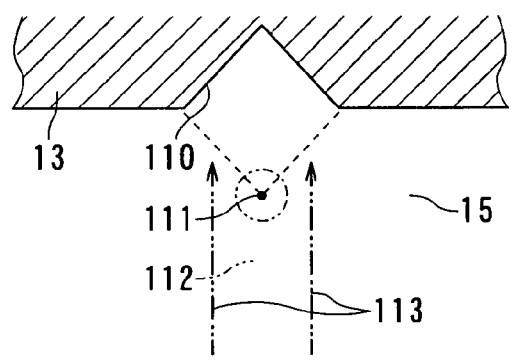
FIG. 15 is an enlarged sectional view showing a vibrator of the present invention.
Figure 16:
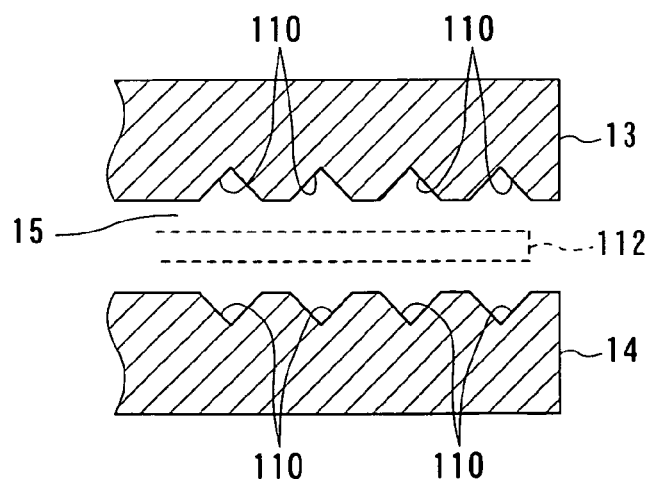
FIG. 16 is a sectional view showing a modification of the apparatus according to the seventh embodiment of the present invention.

A seventh embodiment of the present invention provides a liquid-mixing apparatus for generating ultra strong shock waves. FIG. 13 is a schematic view showing the liquid-mixing apparatus according to the seventh embodiment of the present invention. FIG. 14 is an enlarged sectional view of the apparatus shown in FIG. 14. FIG. 15 is an enlarged sectional view showing a vibrator. FIG. 16 is a sectional view showing a modification of the apparatus.

The liquid-mixing apparatus of this embodiment is provided with a reflecting plate 14 and a vibrating plate 13 including an end sheet 13a. A large number of cone-shaped pits 110 are arranged in at least one of a surface of the reflecting plate 14 and a surface of the end sheet 13a, these surfaces facing each other. Shock waves are generated in the pits 110 and then converged on focal sections 111 existing between the vibrating plate 13 and the reflecting plate 14. The focal sections 111 form an ultra strong shock wave-generating region 112 existing between the vibrating plate 13 and the reflecting plate 14.

An entire configuration of the liquid-mixing apparatus of this embodiment is substantially the same as that of, for example, the second embodiment, as shown in FIG. 13. The same components shown in FIG. 13 as those shown in FIG. 6 have the same reference numerals and descriptions about the components are omitted.

In this embodiment, as shown in FIGS. 14 and 15 showing the vibrating plate 13 in a cross section in an enlarged scale, a large number of the cone-shaped pits 110 are arranged to the surface of the end sheet 13a that faces the reflecting plate 14. The pits 110 have a depth of, for example, 0.1 to 1 mm and are arranged at intervals of, for example, 0.0 to 3 mm. After the shock waves reflected by the reflecting plate 14 collide with the walls of the pits 110, the shock waves converge on points on the way to the reflecting plate 14 because of the concave reflection. That is, the shock waves ultrasonically generated by the action of the vibrating plate are allowed to converge on a center region of a cavitation-generating zone 15 by the effects of inclining surfaces of the pits 110. When the vibrating plate 13 is driven, the focal sections 111 that form the ultra strong shock wave-generating region 112 are created between the vibrating plate 13 and the reflecting plate 14. The cavitation bubbles preferably have a diameter of 0.2 to 0.8 mm.

According to this configuration, the shock waves generated in the ultra strong shock wave-generating region 112 formed in the cavitation-generating zone 15 have an intensity that is 10 to 20 times greater than the intensity of shock waves generated in another region of the cavitation-generating zone 15. That is, a high pressure field with 3000 to several ten thousand atmospheric pressures can be created.

FIG. 16 shows a configuration in which a large number of the cone-shaped pits 110 are also arranged in the reflecting plate 14. In this configuration, shock waves reflected by the reflecting plate 14 are incorporated with shock waves generated with the vibrating plate 13, whereby a liquid mixture having an ultra fine particle size can be produced.

[Eighth Embodiment (FIG. 17)]

Figure 17:
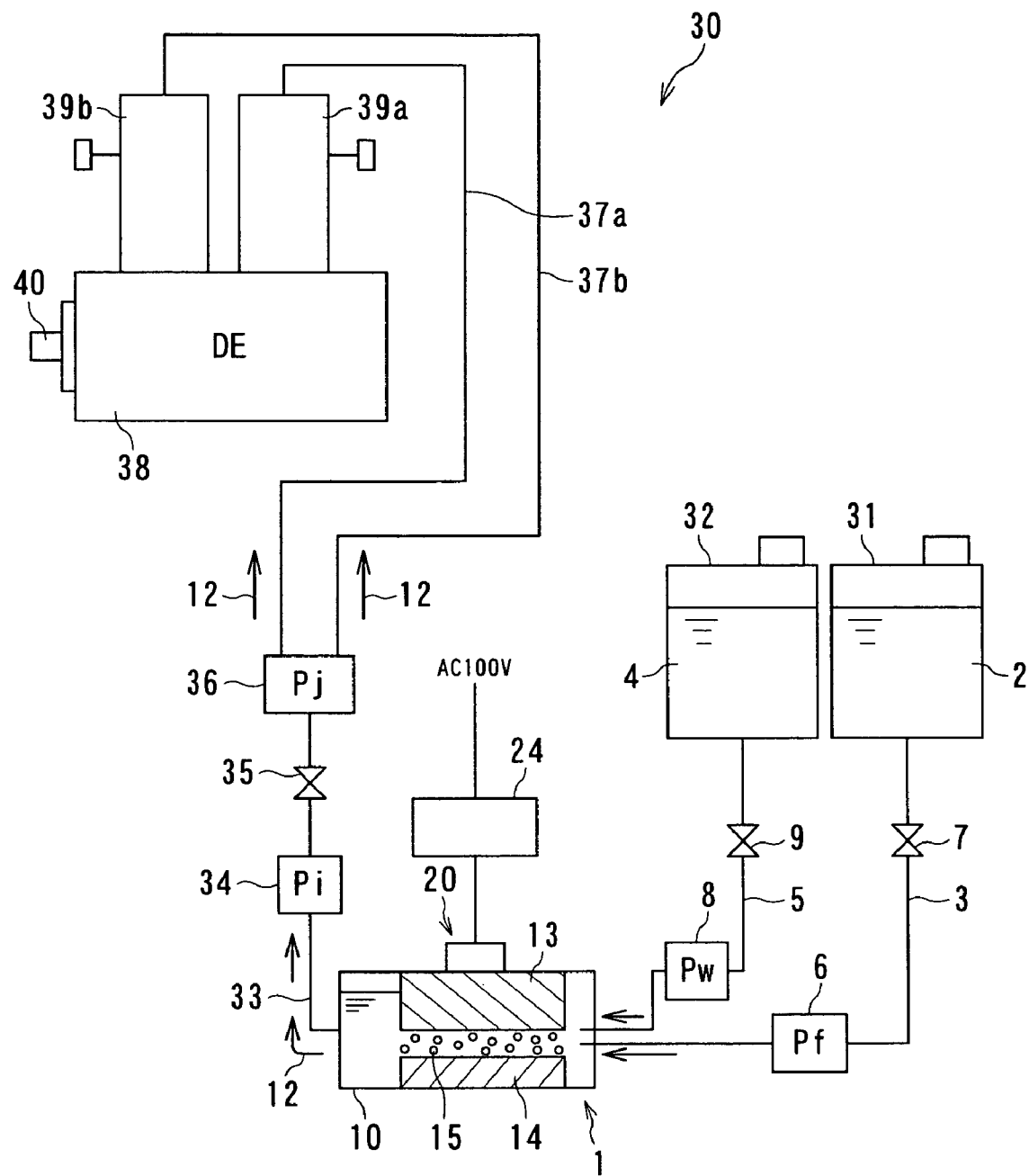
FIG. 17 is an illustration showing a configuration of a diesel engine according to an eighth embodiment of the present invention.

An eighth embodiment of the present invention provides a diesel engine including the fuel apparatus 1 for producing an emulsion fuel according to the first embodiment. FIG. 17 is an illustration showing a configuration of the diesel engine of this embodiment. The same components as those described in the first embodiment have the same reference numerals shown in FIG. 1, and descriptions about the same components as those described in the first embodiment are omitted.

With reference to FIG. 17, the diesel engine 30 is provided with a fuel system including a fuel tank 31 for storing fuel 2 which has not yet treated with cavitation and a water tank 32 for storing fresh water 4 which has not yet treated with cavitation. The fuel tank 31 is connected to the proximal (base) end of a fuel supply line 3 and the water tank 32 is connected to the proximal end of a water supply line 5. The distal (front) end of the fuel supply line 3 is connected to an emulsion fuel-producing tank 10 with a fuel supply pump 6 disposed therebetween and the distal end of the water supply line 5 is connected to the emulsion fuel-producing tank 10 with a water supply pump 8 disposed therebetween.

In the diesel engine 30 having the above configuration, the emulsion fuel-producing tank 10 has substantially the same configuration as that included in the fuel apparatus 1 described in the first embodiment and includes a vibrating plate 13 and a reflecting plate 14, which define a cavitation-generating zone 15. The vibrating plate 13 is vibrated at high frequency with a high-frequency vibration generator 20, whereby the cavitation treatment identical to that described in the first embodiment is performed in the emulsion fuel-producing tank 10. An emulsion fuel supply line 33 acting as a drain line is connected to the secondary side of the emulsion fuel-producing tank 10 and an emulsion fuel 12 produced by the cavitation treatment is discharged or fed to the emulsion fuel supply line 33.

The emulsion fuel supply line 33 is connected to an emulsion fuel injection pump 36 with a suction pump 34 and flow control valve 35 disposed therebetween. The emulsion fuel injection pump 36 is connected to, for example, two fuel injection lines 37a and 37b, which are connected to two cylinders 39a and 39b of a diesel engine body 38, respectively. Reference numeral 40 represents an engine shaft.

In the configuration described above, when the engine is operated, the fuel 2 and fresh water 4 fed to the emulsion fuel-producing tank 10 are uniformly stirred and mixed into an emulsion fuel 12. The thus prepared emulsion fuel 12 is fed to the emulsion fuel injection pump 36 by the operation of the suction pump 34.

The flow rate of the emulsion fuel 12 fed to the emulsion fuel injection pump 36 is controlled by the flow control valve 35 arranged in the emulsion fuel supply line 33 depending on the load of the diesel engine 30. The emulsion fuel 12 fed to the emulsion fuel injection pump 36 is fed to the cylinders 39a and 39b of the diesel engine body 38 through the fuel injection lines 37a and 37b, respectively, and then burned working in the cylinders 39a and 39b. Exhaust gas generated by combustion is discharged out of an exhaust vent, which is not shown.

In this configuration, while the emulsion fuel 12 is being exploded or burned in the cylinders 39a and 39b, the combustion temperature is kept low and the mixing of the fuel with air is enhanced because the fuel is atomized by the small explosion force created by a portion of steam converted from water in the fuel. This promotes the combustion and prevents unburned substance from remaining in the cylinders 39a and 39b. Therefore, the amount of unburned products, so-called dust such as black smoke, caused by incomplete combustion can be greatly reduced. Furthermore, the amount of NOx and dust in the exhaust gas released in the air can be effectively reduced.

According to this embodiment, since the emulsion fuel contains the fuel 2 and the fresh water 4, an advantage of reducing fuel consumption can be achieved.

In this embodiment, the two-cylinder diesel engine is used and a single-cylinder diesel engine or a multi-cylinder diesel engine including three or more cylinders may be used.

[Ninth Embodiment (FIG. 18)]

Figure 18:
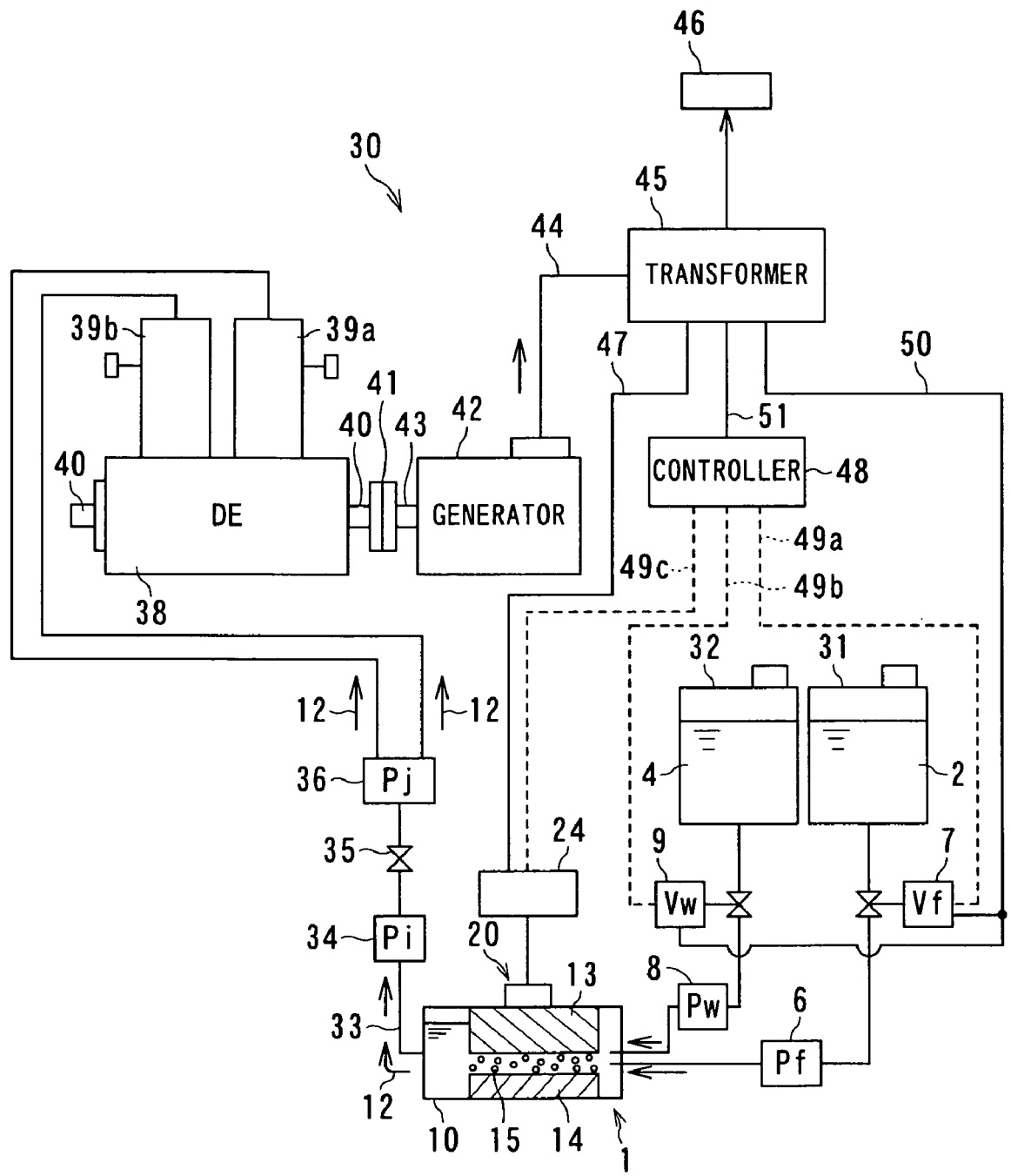
FIG. 18 is an illustration showing a configuration of a diesel engine according to a ninth embodiment of the present invention.

A ninth embodiment of the present invention provides a system including a diesel engine 30 and a power generator attached thereto. FIG. 18 is an illustration showing a configuration of the diesel engine of this ninth embodiment. The same components as those described in the first embodiment have the same reference numerals shown in FIG. 1, and descriptions about the same components as those described in the first embodiment are omitted.

With reference to FIG. 18, the diesel engine 30 includes a rotary shaft 40 and the power generator 42 includes a rotary shaft 43, which is connected to the rotary shaft 40 with a flange 41 interposed therebetween. The power generator 42 is connected to a transformer 45 with a transmission cable 44 interposed therebetween. The generated voltage is converted to a normal voltage (100 V) with the transformer 45 and the power is fed to an output terminal 46 or the like.

The transformer 45 is connected to a high-frequency power supply unit 24 with a power supply cable 47 and a portion of the power generated by the power generator 42 is supplied to a high-frequency vibration generator 20 for generating vibration.

In this embodiment, a fuel flow control valve 7 and a water flow control valve 9, which are of an automatic type, are used to control the supplies of the fuel 2 and the fresh water 4. The fuel flow control valve 7, the water flow control valve 9, and the high-frequency power supply unit 24 are connected to a controller 48 with signal lines 49a, 49b and 49c, respectively, and controlled with the controller 48. The controller 48 is connected to the transformer 45 with a power supply cable 51, and the fuel flow control valve 7 and the water flow control valve 9 are connected to the transformer 45 with a power supply cable 50, whereby driving currents are supplied to the controller 48, the fuel flow control valve 7, and the water flow control valve 9 from the transformer 45.

According to the configuration of this ninth embodiment, since a portion of the power generated by the engine can be used to control and drive the components for producing the emulsion fuel, the following advantages can be achieved in addition to the same advantages as those described in the eighth embodiment: an economical advantage such that the engine can be driven without receiving electricity from an outside source, an advantage such that the system is simple, and an advantage such that moving objects, such as vehicles and ships, including the system can generate electricity by their selves.

[Tenth Embodiment (FIG. 19)]

Figure 19:
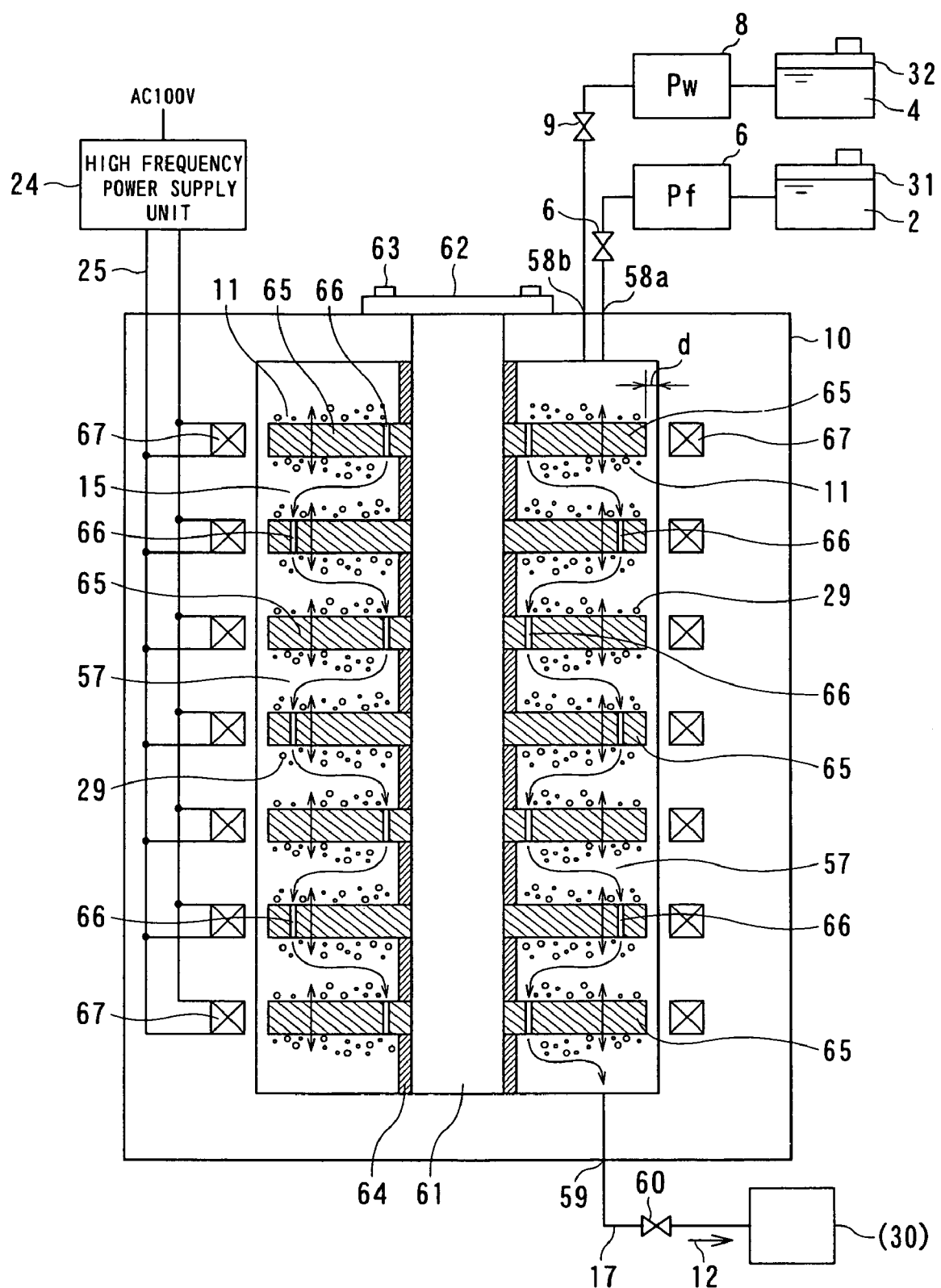
FIG. 19 is an illustration showing a configuration of a fuel apparatus according to a tenth embodiment of the present invention.

A tenth embodiment of the present invention provides a modified fuel apparatus including a single emulsion fuel-producing tank including a plurality of cavitation-generating zones. A plurality of vibratos operating at high frequency are arranged in the fuel apparatus and have corresponding flow paths, respectively, which are alternately arranged and through which a mixture of fuel and fresh water flows, so that the mixture is repeatedly treated by the cavitation in one operation. FIG. 19 is a sectional view showing a configuration of the fuel apparatus of this tenth embodiment.

With reference to FIG. 19, the fuel apparatus of this embodiment includes an emulsion fuel-producing tank 10 having a cylindrical space which has a predetermined length and has the axis parallel to the vertical direction. That is, a channel 57 having a length longer in the vertical direction is formed in the emulsion fuel-producing tank 10. A fuel inlet 58a and a water inlet 58b both connected to the channel 57 are arranged in an upper end of the emulsion fuel-producing tank 10, and an emulsion fuel outlet 59 exists in a lower end thereof. Fuel 2 fed with a fuel supply pump 6 and fresh water 4 fed with a water supply pump 8 are introduced into the emulsion fuel-producing tank 10 through the fuel inlet 58a and the water inlet 58b, respectively, allowed to flow in the emulsion fuel-producing tank 10, continuously drained out through a drain pipe 17 connected to the emulsion fuel outlet 59, allowed to flow through a flow control valve 60, and then fed to a combustor (for example, a diesel engine 30).

A vertically longer pillar-shaped guide rod 61 extends through a center area of the emulsion fuel-producing tank 10 and is fixed to the emulsion fuel-producing tank 10 in such a manner that a flange 62 attached to the top of the guide rod 61 is fixed to the emulsion fuel-producing tank 10 by, for example, bolts 63. A plurality of elastic supports 64 with a cylindrical shape are fitted in an outer surface of the guide rod 61 in such a manner that the elastic supports 64 are arranged at equal intervals. A plurality of disc-shaped vibrators 65 containing a magnetostrictive material are fitted in the guide rod 61 so that the vibrators 65 are arranged between the elastic supports 64, respectively, at predetermined intervals. The vibrators 65 move up and down in parallel to the axis of the guide rod 61, that is, in parallel to the direction in which the fuel flows vertically, so that the vibrators 65 are each vertically sandwiched between the elastic supports 64. Gaps d, having a small width, for preventing the vibrators 65 from making contact with the emulsion fuel-producing tank 10 exist between outer ends of the vibrators 65 and the inner surface of the emulsion fuel-producing tank 10.

The vibrators 65 have holes or narrow perforations 66 through which a liquid mixture 11 prepared by mixing the fuel 2 and the fresh water 4 flows vertically. The narrow perforations 66 are arranged in an inner area or outer area of each vibrator 65. That is, some of the narrow perforations 66 exist in an inner area of one of the narrow perforations 66 vertically adjacent to each other and some of the narrow perforations 66 exist in an outer area of the other one of the narrow perforations 66. High-frequency coils 67 are arranged in the emulsion fuel-producing tank 10 so that the coils 67 surround the corresponding vibrators 65, respectively. Currents for vibration are applied to the coils 67 from a high-frequency power supply unit 24 through a power supply cable 25, whereby a high-frequency magnetic field is created. The magnetic field allows the vibrators 65 to generate vertical vibration. The high-frequency power supply unit 24, as well as the units described in other embodiments, is supplied with power from a commercial power supply, a vehicle battery or a private power generator to generate high-frequency power.

In the apparatus of this tenth embodiment, the high-frequency power supply unit 24 supplies high-frequency currents to the coils 67 and the high-frequency currents allow the coils 67 to generate high-frequency magnetic forces. These magnetic fields allow the coils 67 arranged therein to expand and contract repeatedly in the axis direction. The expansion and contraction are transmitted to the cavitation-generating zones between the vibrators 65, which generate high-frequency vibration.

According to this action, the cavitation bubbles 29 are created and then broken repeatedly between the vibrators 65, whereby shock waves are generated in the liquid mixture 11 flowing in a meandering manner downward between the narrow perforations 66. This results in the generation of high-pressure in the liquid mixture 11. Therefore, in this embodiment, the liquid mixture 11 is converted into a uniform emulsion fuel 12 while the liquid mixture 11 is flowing through the narrow perforations 66 successively. Large molecular chains of the fuel 2 of the liquid mixture 11 are broken and the fresh water 4 is atomized into fine particles. Hence, the emulsion fuel 12 is fed to a combustor, for example, the diesel engine 30 or the like so that the emulsion fuel 12 contains reduced amounts of high molecular components that cause dust during combustion. That is, the emulsion fuel 12, uniformly mixed and stirred, having fine particle size is drained out. Therefore, if the emulsion fuel 12 is supplied to a combustor, dust and other emissions can be prevented from being created, and hence, the same advantage as that of cleaning exhaust gas can be achieved.

According to this embodiment, the treatment time per unit volume is long because the liquid mixture 11 is allowed to flow repeatedly between a plurality of the vibrators 65 and the cavitation bubbles 29 are thereby created and broken repeatedly in addition to the effects as those described for the afore-mentioned embodiment. Thus, reformation can be efficiently performed with high reproducibility by controlling the supplies of the fuel 2 and the fresh water 4.

In this embodiment, the liquid mixture 11 prepared by mixing the fuel 2 and the fresh water 4 is allowed to flow in parallel to the axis of the emulsion fuel-producing tank 10, that is, the liquid mixture 11 is allowed to flow in the vertical direction. However, the liquid mixture 11 may be allowed to flow in any direction such as a horizontal direction or a slant direction.

[Eleventh Embodiment (FIG. 20)]

Figure 20:
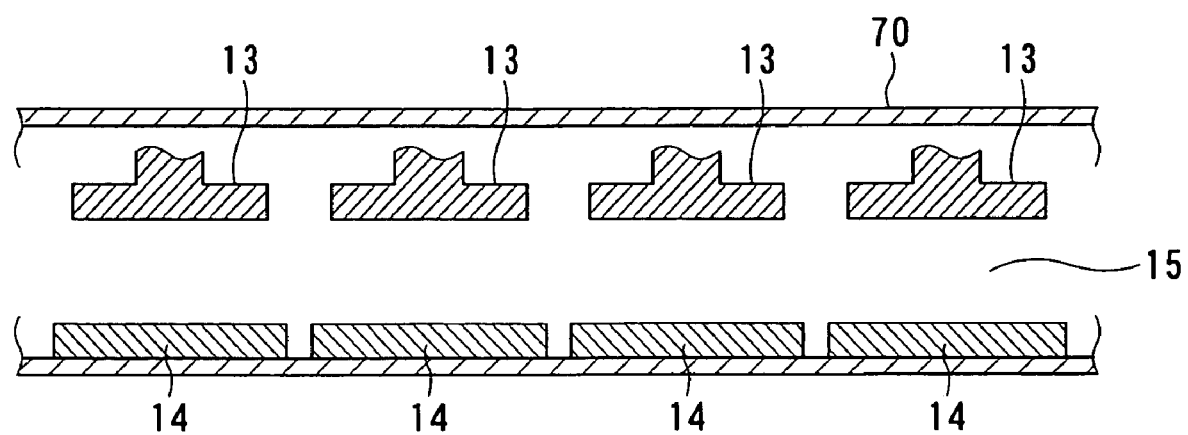
FIG. 20 is an illustration showing a configuration of a liquid-mixing apparatus according to an eleventh embodiment of the present invention.

An eleventh embodiment of the present invention provides a system provided with a large number of liquid-mixing apparatuses described in the first to seventh embodiments. FIG. 20 is a schematic view showing the liquid-mixing apparatuses according to this eleventh embodiment.

With reference to FIG. 20, in this embodiment, a plurality of vibrating plates 13 and reflecting plates 14 are arranged in a single vessel 70 in such a manner that the vibrating plates 13 are each placed in parallel to the corresponding reflecting plate 14. The vibrating plates 13 are ultrasonically vibrated simultaneously at high frequency. This creates a cavitation-generating zone extending over a wide range.

Therefore, if the vessel 70 has a large size and the cavitation-generating zone is created so as to extend in a large area thereof, a large amount of mixture components can be converted into a mixture having a fine particle size in one step.

If the vessel 70 has a tubular shape, the vibrating plates 13 and the reflecting plates 14 are arranged in the axis direction of the vessel 70, and the mixture components are allowed to flow in the axis direction of the vessel 70, the system can continuously apply shock wave energy to the mixture components to increasingly reduce the particle size to an ultra fine level.

INDUSTRIAL APPLICABILITY

As described above, according to the liquid-mixing apparatus and liquid-mixing method of the present invention, the cavitation can be extremely efficiently generated and effectively used. Therefore, in particular, a liquid mixture, such as an emulsion fuel, an industrial liquid material, a food, a cosmetic, or a drug, having an ultra fine particle size can be produced in a short time. The liquid mixture further has an ultra high mixture density and high quality. Furthermore, components of the liquid mixture are hardly separated from each other if the liquid mixture is stored over a long of time.

The invention claimed is:

1. A liquid-mixing apparatus for producing a liquid mixture obtained by mixing two or more liquid components, a liquid mixture obtained by mixing a liquid component and a gas component, a liquid mixture obtained by mixing a liquid component and a powder component, or a combination of some of the liquid mixtures mentioned above, the liquid-mixing apparatus comprising:

a vessel for storing the mixture components, the vessel having a recess formed to a bottom wall thereof;

a vibrator disposed in the vessel and having at least one surface with a predetermined area contacting the mixture components;

a high-frequency vibration generator, connected to the vibrator, for vibrating the vibrator at high frequency in a direction perpendicular to said one surface;

a reflector disposed in the recess in the bottom wall of the vessel to be detachable, the reflector being arranged with a space from the vibrator at a small distance of 10 mm or less so that the surface of the vibrator contacting the mixture components faces a surface of the reflector, and reflecting high-frequency vibration transmitted from the vibrator to create reflected waves in the mixture components flowing between the facing faces; and a drain pipe provided for a side wall of the vessel for draining the liquid mixture, wherein the vessel is provided with one or more perforations as inlet ports which extend through a center area of the reflector and penetrate the bottom portion of the vessel, and through which the mixture components are fed to a space between the vibrator and the reflector through a mixture component supply line connected to the perforation, the vibrator and the reflector cooperate to create cavitation bubbles in the mixture components utilizing a decompression action of the vibrator allowed to move away from the reflector by the high-frequency vibration transmitted from the high-frequency vibration generator to the vibrator and also cooperate to break the cavitation bubbles utilizing the compression action of the vibrator allowed to move toward the reflector, shock wave energy generated by the breaking action extremely reduces the size of the cavitation bubbles and promotes the diffusion of the mixture components, so that the liquid mixture is allowed to have an ultra fine particle size and high density, and at least one of a surface of the vibrator that faces the reflector and a surface of the reflector that faces the vibrator has a large number of bottomed pits which are cone-shape in section for generating shock waves, the shock waves generated in the pits are converged on focal sections existing between the vibrator and the reflector, and the focal section form an ultra strong shock wave-generating zone existing between the vibrator and the reflector.

2. The liquid-mixing apparatus according to claim 1, wherein the high-frequency vibration transmitted from the high-frequency vibration generator to the vibrator has an ultrasonic frequency.

3. The liquid-mixing apparatus according to claim 1, wherein the high-frequency vibration generator includes a ceramic piezoelectric vibrating member or a vibrating member composed of a super magnetostrictive material or a magnetostrictive material and the vibrator is provided with the reflector or connected to the reflector with a space present therebetween.

4. The liquid-mixing apparatus according to claim 1, wherein the vibrator has a surface section, and the reflector has a surface section facing the surface section of the vibrator, and at least one of these surface sections contains a hard material resistant to cavitation damage caused by the cavitation bubbles.

* * * * *